US007031805B2

(12) United States Patent
Lee et al.

(10) Patent No.: US 7,031,805 B2
(45) Date of Patent: Apr. 18, 2006

(54) ROBOT CLEANER SYSTEM HAVING EXTERNAL RECHARGING APPARATUS AND METHOD FOR DOCKING ROBOT CLEANER WITH EXTERNAL RECHARGING APPARATUS

(75) Inventors: Ju-sang Lee, Wgangju (KR); Ki-man Kim, Gwangju (KR); Jang-youn Ko, Gwangju (KR); Jeong-gon Song, Gwangju (KR); Kyong-hui Jeon, Seosan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 286 days.

(21) Appl. No.: 10/682,484

(22) Filed: Oct. 10, 2003

(65) Prior Publication Data

US 2004/0158357 A1 Aug. 12, 2004

(30) Foreign Application Priority Data

Feb. 6, 2003 (KR) ...................... 10-2003-0007426
Mar. 6, 2003 (KR) ...................... 10-2003-0013961
May 9, 2003 (KR) ...................... 10-2003-0029242

(51) Int. Cl.
*G06F 19/00* (2006.01)

(52) U.S. Cl. ...................... 700/245; 700/255; 700/256; 700/257; 700/258; 700/259; 700/264

(58) Field of Classification Search ........ 700/245–259, 700/264
See application file for complete search history.

(56) References Cited

U.S. PATENT DOCUMENTS 4,496,896 A 1/1985 Melocik et al.
5,440,216 A 8/1995 Kim
5,646,494 A 7/1997 Han
5,709,007 A * 1/1998 Chiang ........................ 15/329
5,995,884 A * 11/1999 Allen et al. ................... 701/24
6,389,329 B1 * 5/2002 Colens ....................... 700/245
6,525,509 B1 * 2/2003 Petersson et al. ........... 320/107
6,532,404 B1 * 3/2003 Colens ....................... 700/245
6,580,246 B1 * 6/2003 Jacobs ................... 318/568.16

(Continued)

FOREIGN PATENT DOCUMENTS

GB 2185866 7/1987

(Continued)

OTHER PUBLICATIONS

Dutch Industrial Property Office Search Report with respect to Dutch Application No. 1024382 filed on Sep. 25, 2003 (8 pp.).

(Continued)

*Primary Examiner*—Thomas G. Black
*Assistant Examiner*—McDieiunel Marc
(74) *Attorney, Agent, or Firm*—Blank Rome LLP

(57) ABSTRACT

A robot cleaner system for detecting an external recharging apparatus which is positioned in a non-detectable area by an upper camera thereof, and a docking method for docking the robot cleaner system with the external recharging apparatus. The robot cleaner system includes an external recharging apparatus with a power terminal connected to a utility power supply, a recharging apparatus recognition mark formed on the external recharging apparatus, and a robot cleaner, having a recognition mark sensor that detects the recharging apparatus recognition mark, and a rechargeable battery. The robot cleaner automatically docks to the power terminal to recharge the rechargeable battery. The recharging apparatus recognition mark is made of retroreflective material or a metal tape, and the recognition mark sensor may be a photosensor or a proximity sensor.

30 Claims, 16 Drawing Sheets

U.S. PATENT DOCUMENTS

| | | | | |
|---|---|---|---|---|
| 6,586,908 | B1 * | 7/2003 | Petersson et al. | 320/107 |
| 6,748,297 | B1 * | 6/2004 | Song et al. | 700/245 |
| 6,870,475 | B1 * | 3/2005 | Fitch et al. | 340/539.12 |
| 6,896,468 | B1 * | 5/2005 | Gallea et al. | 414/395 |
| 2002/0120364 | A1 * | 8/2002 | Colens | 700/245 |
| 2002/0153185 | A1 * | 10/2002 | Song et al. | 180/167 |
| 2003/0094922 | A1 * | 5/2003 | Peterson et al. | 320/109 |
| 2004/0004460 | A1 * | 1/2004 | Fitch et al. | 320/108 |
| 2004/0015266 | A1 * | 1/2004 | Skoog | 700/245 |
| 2004/0093650 | A1 * | 5/2004 | Martins et al. | 901/1 |

FOREIGN PATENT DOCUMENTS

| | | |
|---|---|---|
| GB | 2 376 536 A | 12/2002 |
| JP | 4-210704 | 7/1992 |
| JP | 07-064637 | 3/1995 |
| JP | 2002/229643 | 8/2002 |
| WO | WO 99/38237 | 7/1999 |

OTHER PUBLICATIONS

Preliminary Search Report, dated Nov. 3, 2004—French Patent Office.

Office Action from Sweden Patent Office, dated Dec. 23, 2004.

British Combined Search and Examination Report issued Mar. 1, 2005 in connection with corresponding application in British Patent Office (Divisional Application Nos. 0501705.8 and 0501707.4.

British Patent Office, Combined Search and Examination Report issued Jun. 16, 2004 in British Patent Application No. 0401879.2.

* cited by examiner

ROBOT CLEANER SYSTEM HAVING EXTERNAL RECHARGING APPARATUS AND METHOD FOR DOCKING ROBOT CLEANER WITH EXTERNAL RECHARGING APPARATUS

FIELD OF THE INVENTION

The present invention relates to a robot cleaner system comprised of a robot cleaner with a rechargeable battery and an external recharging apparatus, and more particularly, to a robot cleaner system capable of detecting and docking with an external recharging apparatus which is disposed at an area undetectable by a camera, and a docking method thereof.

BACKGROUND OF THE INVENTION

Generally, a 'robot cleaner' refers to an apparatus that automatically moves in a predetermined range of working area without requiring manipulation of an operator, performing assigned jobs such as a cleaning job that draws in dust or foreign substances from the floor, or a security job that checks on the doors, windows or gas valves at home.

The robot cleaner determines, through a sensor, the distance to an obstacle at home or office, for example, the distance to the furniture, office equipment, wall, etc., and performs assigned jobs while running in the path on which it would not collide with the obstacles based on the information as detected.

Generally, the robot cleaner is provided with a battery that supplies necessary power for driving, and a rechargeable battery is usually used for this purpose. The robot cleaner is formed with an external recharging apparatus as one system so that the battery can be recharged as necessary.

In order to return the robot cleaner to the external recharging apparatus for recharging, the robot cleaner is required to know where the external recharging apparatus is located.

Conventionally, for determination of where the external recharging apparatus is located, the external recharging apparatus sends out a high frequency signal, and the robot cleaner receives the high frequency signal from the external recharging apparatus and thus finds the location of the external recharging apparatus according to the level of the received high frequency signal.

However, according to the above method that finds the location of the external recharging apparatus based on the level of the detected high frequency signal, determination of the location of the external recharging apparatus is sometimes inaccurate when the level of the high frequency signal varies by the external factors such as reflective waves, interferences, or the like.

Even after the exact location of the external recharging apparatus is found, the power terminal of the external recharging apparatus and the recharging terminal of the robot cleaner may be improperly connected.

In an attempt to overcome the above problems of the prior art, the Applicant has disclosed, "Robot Cleaner System Having External Recharging Apparatus and Docking Method for Docking the Robot Cleaner with External Recharging Apparatus" in U.S. Pat. No. 6,748,297, filed Oct. 31, 2002, which enables the robot cleaner to determine the exact location of the external recharging apparatus and dock with the external recharging apparatus.

According to U.S Pat. No. 6,748,297, the robot cleaner determines the location of the external recharging apparatus using an upper camera and a location recognition mark on a ceiling. Docking with the external recharging apparatus is always accurately made because the process is controlled using a signal from a bumper and a contact signal between the recharging terminal and the power terminal.

However, the robot cleaner system of U.S. Pat. No. 6,748,297 has a limitation in the installation space of the external recharging apparatus. That is, the external recharging apparatus is only formed within the area that is recognizable by the upper camera of the robot cleaner. Accordingly, in the area which is larger than the detectable range by the upper camera, the robot cleaner system can not be efficiently used.

Therefore, a need for a robot cleaner system and a docking method thereof, which enables the robot cleaner to detect the location of the external recharging apparatus even in the outside of the recognizable range of the upper camera, and accurately dock with the external recharging apparatus, has been noted.

SUMMARY OF THE INVENTION

Accordingly, it is an object of the present invention to provide a robot cleaner system having an external recharging apparatus, which is capable of accurately detecting the location of the external recharging apparatus even when the external recharging apparatus is in the outside of the range where the location recognition mark is detectable by an upper camera.

It is another object of the present invention to provide a docking method of the robot cleaner and the external recharging apparatus, enabling the robot cleaner to dock in the external recharging apparatus accurately even when the external recharging apparatus is positioned outside of the recognizable range of the upper camera.

The above object is accomplished by a robot cleaner system according to the present invention, including an external recharging apparatus comprising a power terminal connected to a utility power supply, a recharging apparatus recognition mark formed on the external recharging apparatus, a robot cleaner having a recognition mark sensor that detects the recharging apparatus recognition mark and a rechargeable battery. The robot cleaner automatically docks to the power terminal to recharge the rechargeable battery. A power terminal control unit is installed in the external recharging apparatus for supplying power only during the recharging of the robot cleaner.

The power control unit includes a power terminal supporting member, a resilient member connected by one end to the power terminal supporting member and connected by the other end to the power terminal, for resiliently supporting the power terminal, and, a micro-switch disposed between the power terminal and the power terminal supporting member, operating in accordance with a position change of the power terminal.

The power terminal supporting member includes a support bracket connected to a body of the external recharging apparatus, and a recharging power supply device casing formed at a lower surface of the support bracket, and having a connection protrusion protruding from the upper surface for a connection with the micro-switch.

The recharging apparatus recognition mark is formed on a side of the power terminal. The recharging apparatus recognition mark is made of a retroreflective material, and the recognition mark sensor is a photo-sensor that can detect the retroreflective material.

The recharging apparatus recognition mark is formed on a floor in front of the external recharging apparatus. The recharging apparatus recognition mark is made of a metal tape, and the recognition mark sensor is a proximity sensor that can detect the metal tape.

The above object is also accomplished by a robot cleaner system according to the present invention, including an external recharging apparatus and a robot cleaner. The external recharging apparatus includes a power terminal connected to a utility power supply, a terminal block having the power terminal installed thereon, being disposed stationary in a predetermined location, and a recharging apparatus recognition mark formed on a bottom ahead of the terminal block. The robot cleaner includes a recognition mark sensor formed on the bottom of a robot cleaner body to detect the recharging apparatus recognition mark, a driving unit for moving the robot cleaner body, an upper camera mounted on the robot cleaner body to capture images of a ceiling, a bumper mounted on an outer circumference of the robot cleaner body, to output a collision signal when the robot cleaner collides with an obstacle, a recharging terminal mounted on the bumper being connectible with the power terminal, a rechargeable battery mounted on the robot cleaner body to be recharged with power fed through the recharging terminal, and a control unit, upon the reception of a recharging command, detecting the recharging apparatus recognition mark by using the recognition mark sensor, and controlling the driving unit to connect to the external recharging apparatus.

The recharging apparatus recognition mark is formed in a perpendicular relation with respect to the terminal block. The recognition mark sensor is mounted on the bottom of the robot cleaner body in the direction where the bumper is mounted.

The recharging apparatus recognition mark is a metal tape, and the recognition mark sensor is a proximity sensor capable of detecting the metal tape.

The control unit determines the recharging terminal to be connected with the power terminal only when there is the collision signal received from the bumper and then, a contact signal indicating contact between the recharging terminal and the power terminal.

The robot cleaner further includes a battery power measuring unit that detects a remaining power of the rechargeable battery, and upon the reception of a recharging request signal from the battery power measuring unit, the robot cleaner stops performing the assigned job and returns to the external recharging apparatus.

According to the present invention, a docking method of a robot cleaner for docking with an external recharging apparatus includes the steps of: the robot cleaner operating from a connection with the external recharging apparatus with the reception of a work start signal; the robot cleaner, upon detecting a first location recognition mark through an upper camera during the running, storing an upper image where the location recognition mark is first detected as an entry spot information; the robot cleaner performing an assigned job, with an input of a recharge command signal; the robot cleaner returning to the entry spot by using a current location information and the stored entry spot information, wherein the current location information is calculated from the upper images captured by the upper camera; detecting the external recharging apparatus by detecting, through a sensor, on a robot cleaner body a recharging apparatus recognition mark; the robot cleaner connecting to a power terminal of the external recharging apparatus by a recharging terminal thereof; and, recharging a rechargeable battery with external power through the recharging terminal.

The step of detecting the external recharging apparatus includes the steps of the robot cleaner running in a forward direction, determining whether there is an obstacle existing ahead, determining the obstacle, and running in one direction following along the obstacle. The robot cleaner determines whether a recharging apparatus recognition mark is detected during the running, and upon the recharging apparatus recognition mark being detected, proceeding to the external recharging apparatus connecting step. Without the recharging apparatus recognition mark being detected, the robot cleaner determines whether the running distance exceeds a predetermined reference distance, and if so, rotates by 180° and operates to follow along the obstacle.

The step of connecting the external recharging apparatus includes the steps of the robot cleaner: rotating so that the recharging terminal of the robot cleaner faces towards the external recharging apparatus; operating and determining whether or not a collision signal with a bumper is received; and after the collision signal of the bumper is received, determining whether or not a contact signal is received. The contact signal indicating the recharging terminal of the robot cleaner contacts with the power terminal of the external recharging apparatus. Without the contact signal being received after the reception of the collision signal from the bumper, the robot cleaner adjusts its running angle by a predetermined angle and determines whether or not the contact signal is received or not. When there is no contact signal received after a predetermined number of running angle adjustments of the robot cleaner, the robot cleaner retreats to the entry spot.

The adjustment to the running angle of the robot cleaner is set to 15° each time, and the number of adjustments to the running angle of the robot cleaner is set to 6 times.

The recharge command signal is generated when there is a shortage of power in the step of performing an assigned job, or when the step of performing an assigned job is completed.

With the robot cleaner system having the external recharging apparatus according to the present invention, even when the external recharging apparatus is positioned outside the detectable area where the location recognition mark is detected by an upper camera of the robot cleaner, the location of the external recharging apparatus is accurately found.

Further, according to the docking method of the robot cleaner with the external recharging apparatus, the robot cleaner can accurately find and dock in the external recharging apparatus even when the external recharging apparatus is positioned outside the recognizable area by the upper camera.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 1:
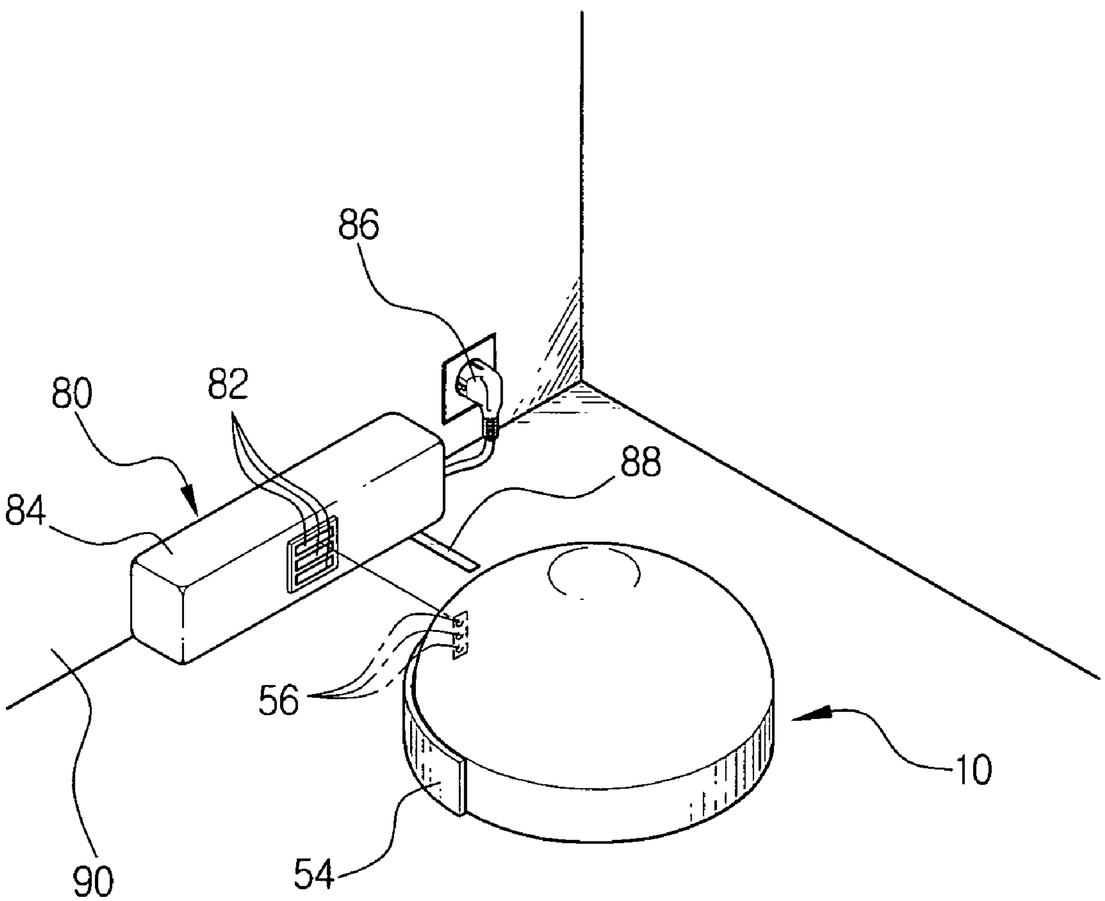
FIG. 1 is a perspective view of a robot cleaner system having an external recharging apparatus according to the present invention.
Figure 2:
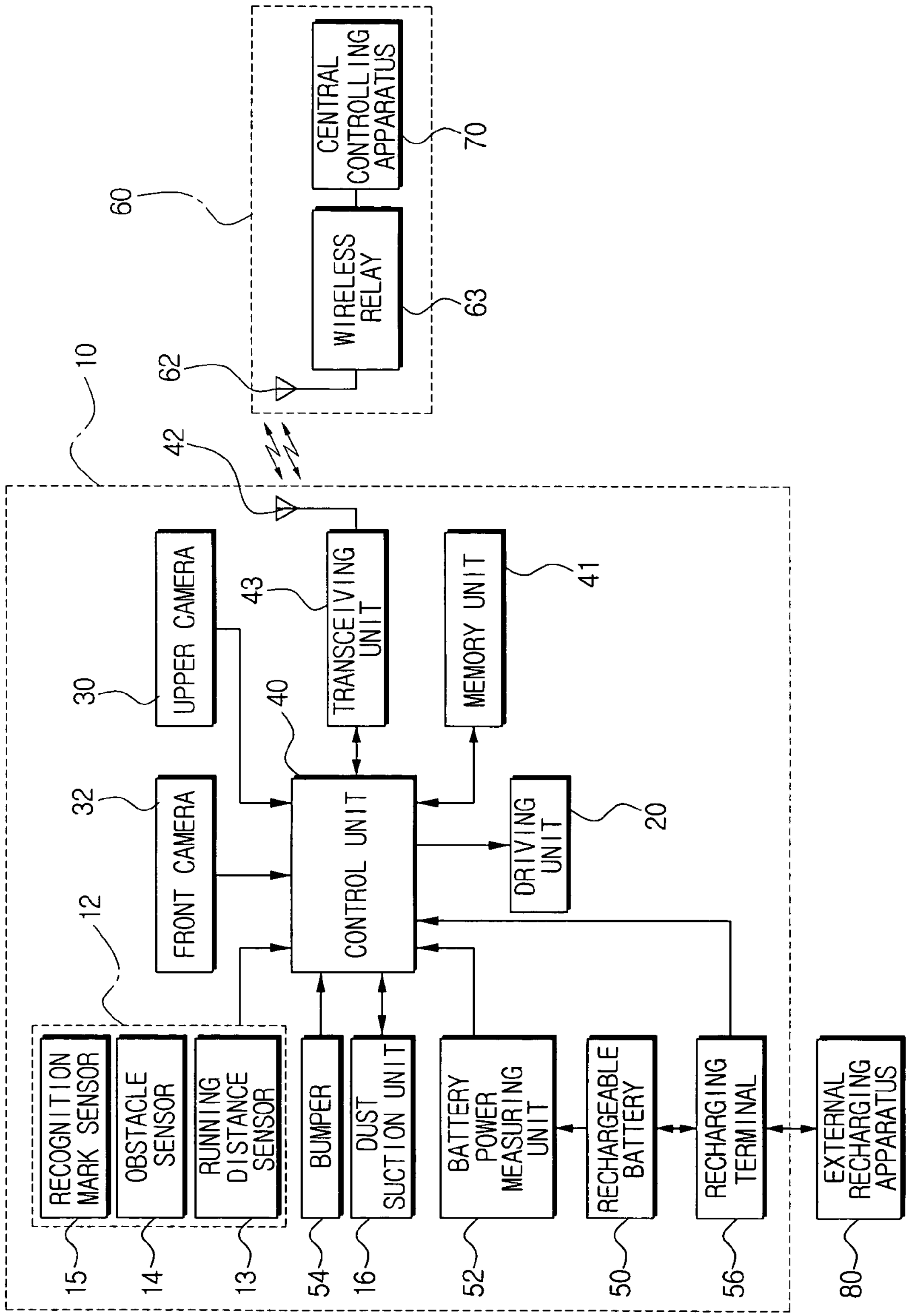
FIG. 2 is a block diagram of the robot cleaner system of FIG. 1.
Figure 3A:
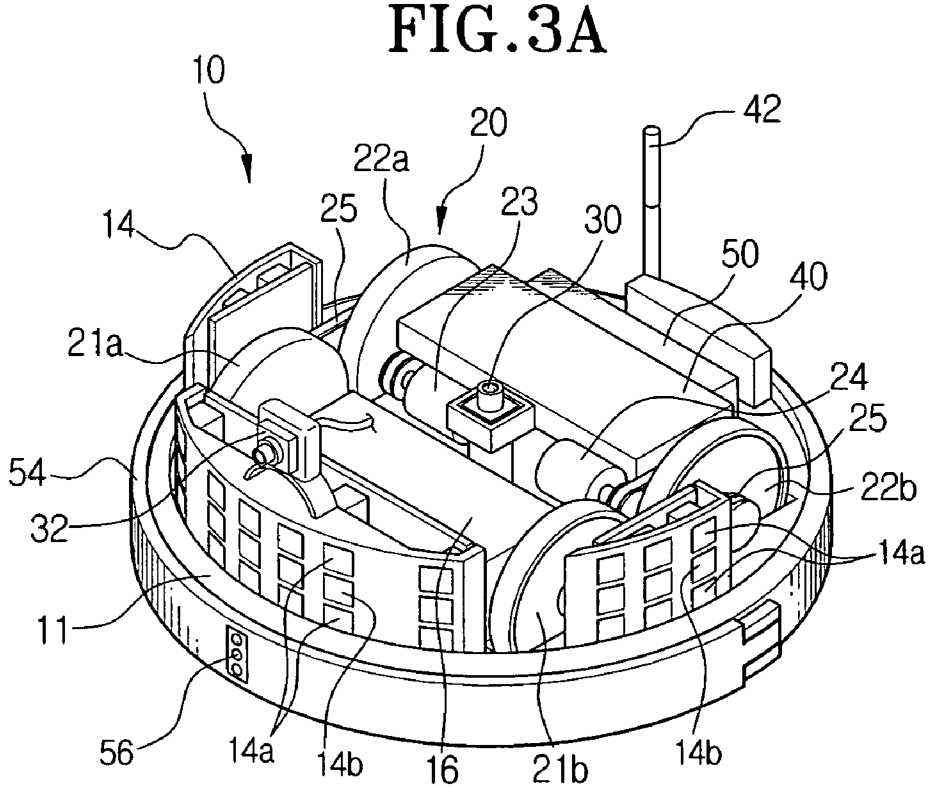
FIGS. 3A and 3B are perspective views of the robot cleaner of FIG. 1, from which a cover is separated.
Figure 3B:
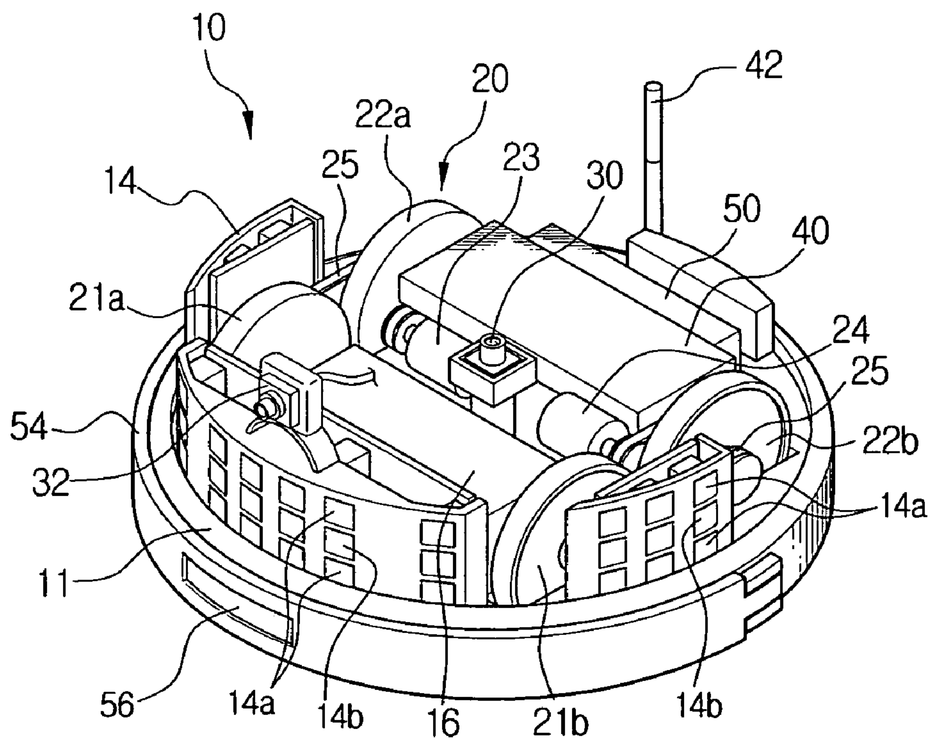
Figure 4:
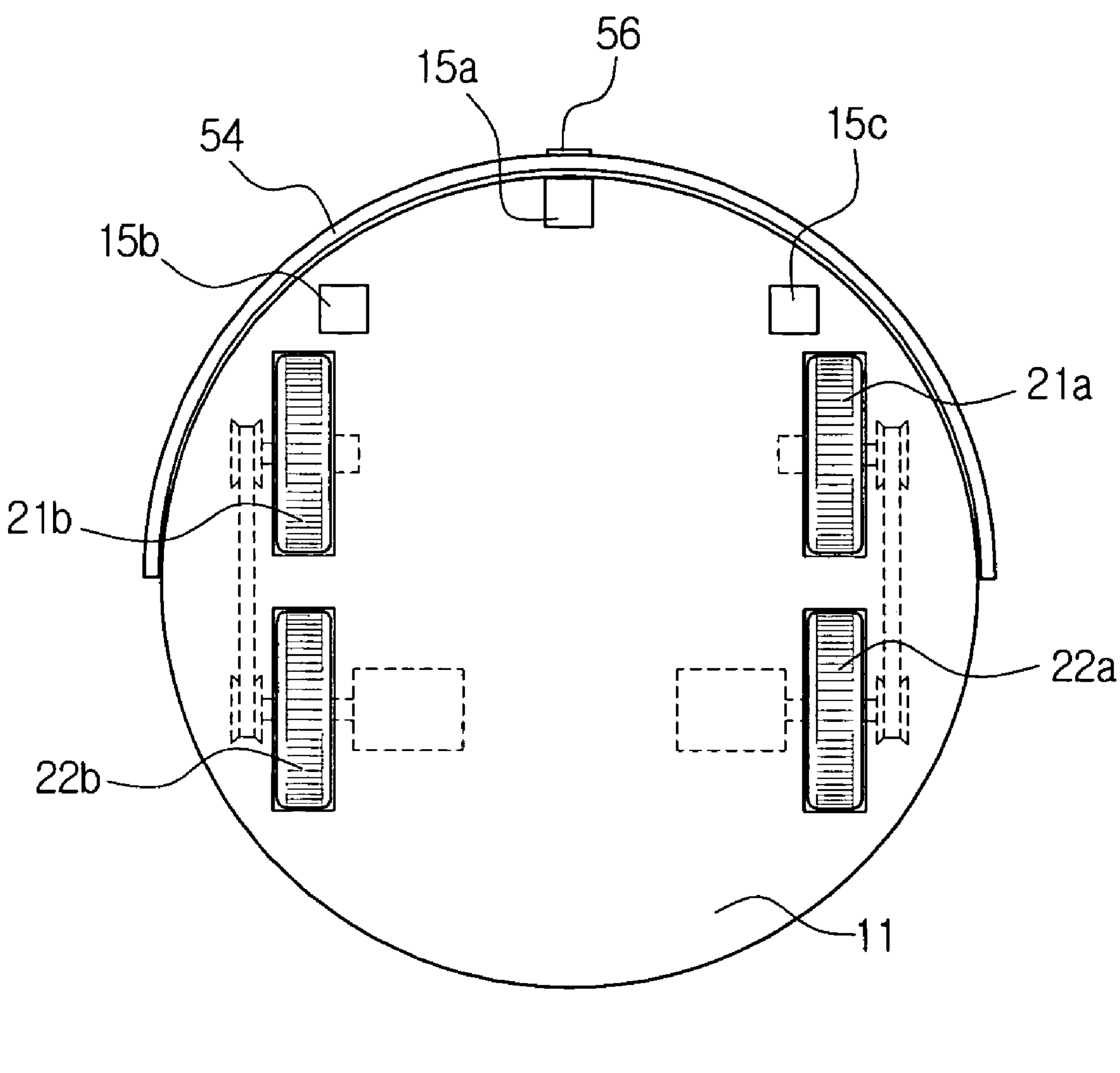
FIG. 4 is a bottom view of the robot cleaner of FIG. 3, showing bottom of the cleaner body.

Referring to FIGS. 1–3, the robot cleaner system includes a robot cleaner and an external recharging apparatus.

The robot cleaner 10 includes a body 11, a dust suction unit 16, a driving unit 20, an upper camera 30, a front camera 32, a control unit 40, a memory unit 41, a transceiving unit 43, a sensor unit 12, a bumper 54 and a rechargeable battery 50.

The dust suction unit 16 is formed on the body 11 to draw in air together with dust from the floor that it encounters. The dust suction unit 16 can be constructed in various known ways. For example, the dust suction unit 16 may include a suction motor (not shown), and a dust chamber for collecting dust that is, with the driving of the suction motor, drawn in through a suction port or a suction pipe formed oppositely to the floor.

The driving unit 20 includes a pair of front wheels 21*a*, 21*b* formed at both front sides, a pair of rear wheels 22*a*, 22*b* formed at both rear sides, motors 23, 24 for rotating the rear wheels 22*a*, 22*b*, and a timing belt 25 disposed to transmit a driving force from the rear wheels 22*a*, 22*b* to the front wheels 21*a*, 21*b*. The driving unit 20 drives the motors 23, 24 to rotate independently from each other in a forward or backward direction. The running direction of the robot cleaner 10 is determined by controlling the motors 23, 24 to rotate at different RPM.

The front camera 32 is mounted on the body 11 to capture images ahead of the robot cleaner and output captured images to the control unit 40.

The sensor unit 12 is provided with a recognition mark sensor 15 that detects a recharging apparatus recognition mark 88, obstacle sensors 14 arranged on the side of the body 11 at predetermined intervals to send out the signal and then receive a reflected signal, and a running distance sensor 13 that measures the running distance of the robot cleaner 10.

The recognition mark sensor 15 is formed on the bottom of the body 11 to detect the recharging apparatus recognition mark 88 of the external recharging apparatus 80. The recognition mark sensor 15 may be preferably formed at a front lower part of the body 11, on which the bumper 54 is disposed, to detect the recognition mark 88 as the robot cleaner 10 is advanced. More specifically, three recognition mark sensors 15*a*, 15*b*, 15*c* are arranged in two lines, such that with the front sensor 15*a* turned on and one of the rest sensors 15*b*, 15*c* turned on, it is recognized that there exists the recharging apparatus recognition mark 88. Various methods may be used to construct the combination of the recognition mark sensor 15 and the recharging apparatus recognition mark 88, provided that the recognition mark sensor 15 can properly detect the recharging apparatus recognition mark 88. For example, a metal tape can be used as the recharging apparatus recognition mark 88, while a proximity sensor that can detect the metal tape is used as the recognition mark sensor 15.

Figure 14A:
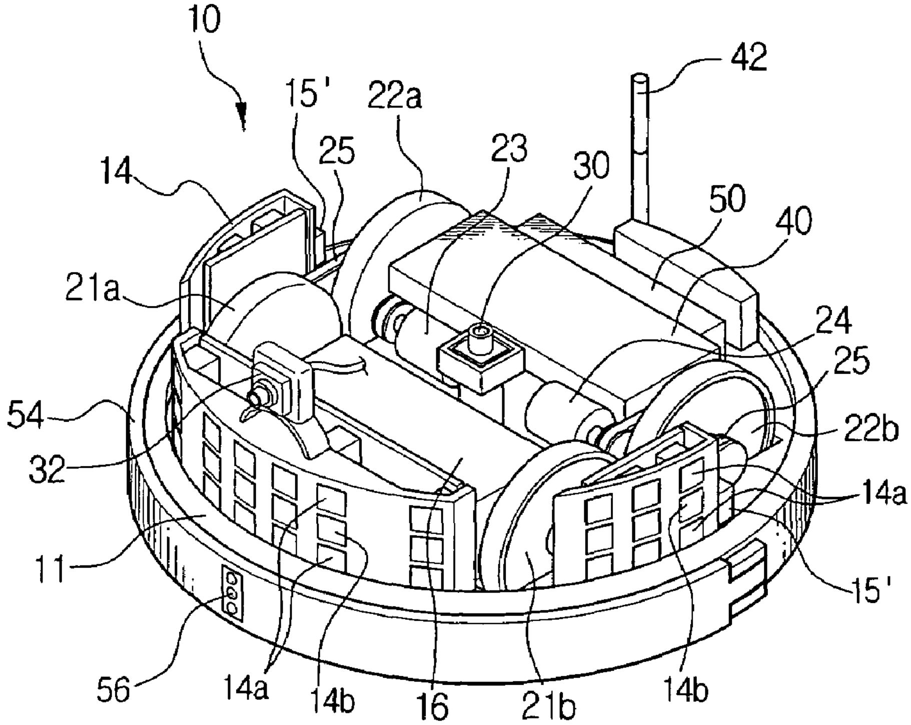
FIG. 14A is a perspective view of the robot cleaner of FIG. 13 from which a cover is separated to show recognition mark sensors disposed at both sides of the body.
Figure 14B:
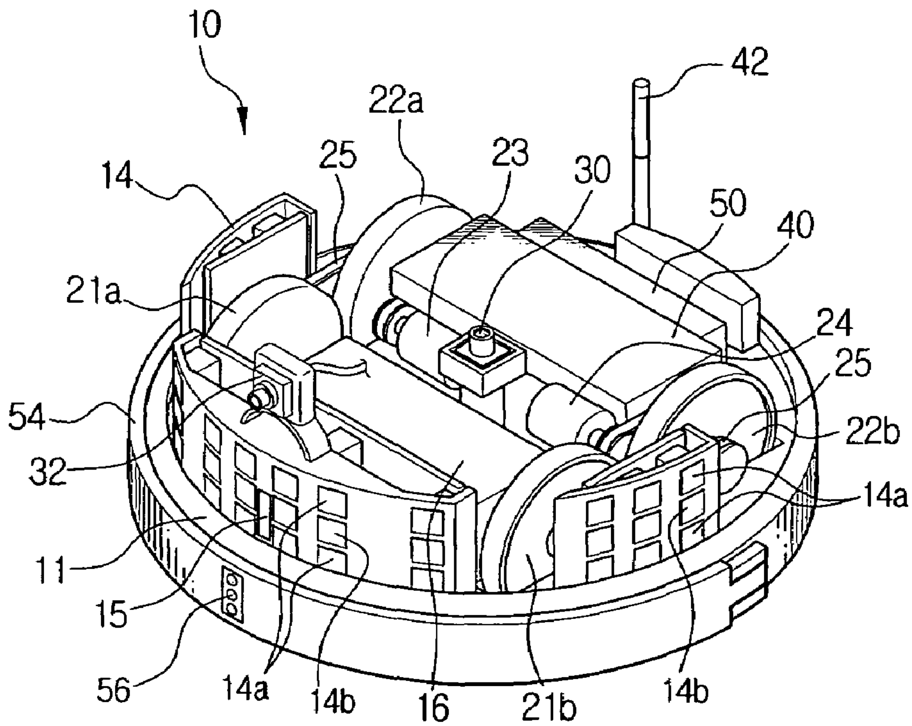
FIG. 14B is a perspective view of the robot cleaner of FIG. 13 from which a cover is separated to show a recognition mark sensor disposed at the front of the body.

According to another preferred embodiment of the present invention, as shown in FIGS. 14A–B, the recognition mark sensor 15' is disposed on the upper side of the robot cleaner body 11 to detect the recharging apparatus recognition mark 89 formed at the front of the external recharging apparatus 80. Depending on the method type stored in the control unit 40 and employed to detect the external recharging apparatus, the recognition mark sensor 15' may be formed on the front side of the robot cleaner 10, i.e., on the upper side of the bumper 54, or on both sides of the robot cleaner 10 (see FIGS. 14A and 14B). Further, the recognition mark sensor 15' is the sensor that can detect the retroreflective material of the recharging apparatus recognition mark 89, and usually, a reflective photosensor is used. The photosensor includes a light emitting portion that emits light, and a light receiving portion that receives the light reflected from the retroreflective material.

The obstacle sensor 14 includes a plurality of infrared light emitting elements 14*a* that emit an infrared ray, and a plurality of light receiving elements 14*b* paired with the respective infrared light elements 14*a* to receive the reflected lights. The pairs of infrared light emitting elements 14*a* and light receiving elements 14*b* are arranged in a vertical line along the outer circumference of the body 11. In an alternative example, the obstacle sensor 14 may be provided with an ultra sensor that emits the ultra ray and receive the reflected light. The obstacle sensor 14 may also be used to measure the distance from the robot cleaner 10 to the obstacle or to the wall.

A rotation sensor may be employed as the running distance sensor 13, detecting the RPM of the wheels 21*a*, 21*b*, 22*a*, 22*b*. For example, the rotation sensor may include an encoder that detects the RPM of the motors 23, 24.

The transceiving unit 43 sends out data to be transmitted through an antenna 42, receives a signal through the antenna 42, and transmits the received signal to the control unit 40.

The bumper 54 is mounted on the outer circumference of the body 11, to absorb an impact if the robot cleaner 10 collides with the obstacle such as a wall, and sends out a collision signal to the control unit 40. The bumper 54 is supported on a resilient member (not shown) so that it can move forward and backward in the parallel direction with respect to the floor along which the robot cleaner 10 runs. Additionally, a sensor is attached to the bumper 54 to output a collision signal to the control unit 40 when the bumper 54 collides with the obstacle. Accordingly, when the bumper 54 collides with the obstacle, a predetermined collision signal is transmitted to the control unit 40. At a height corresponding to the power terminal 82 of the external recharging apparatus 80, the recharging terminal 56 is installed on the front side of the bumper 54. If it is the three-phase power that is used for a power supply, three recharging terminals 56 are arranged.

The rechargeable battery 50 is mounted on the body 11, and connected to the recharging terminal 56 at the bumper 54. Accordingly, as the recharging terminal 56 is connected with the power terminal 82 of the external recharging apparatus 80, the rechargeable battery 50 is recharged with utility AC power. That is, where the robot cleaner 10 is connected with the external recharging apparatus 80, the power fed from the utility AC power supply through a power cord 86, is fed from the power terminal 82 of the external recharging apparatus 80 and recharged into the rechargeable battery 50 through the recharging terminal 56 of the bumper 54.

Also provided is a battery power measuring unit 52, which detects remaining power of the rechargeable battery 50. If the detected power of the rechargeable battery 50 reaches below a predetermined low limit, the battery power measuring unit 52 sends out a recharging request signal to the control unit 40.

The control unit 40 processes signals received through the transceiving unit 42, and accordingly controls the respective parts. A key input device (not shown) having a plurality of keys may be additionally provided on the body 11 for the input of function setting, and in this case, the control unit 40 may process the key signal input from the key input device.

When not in operation, the control unit 40 controls so that the robot cleaner 10 waits in a recharging connection mode with the external recharging apparatus 80. As the robot cleaner is in such a standby mode, that is, in connection with the external recharging apparatus 80, the rechargeable battery 50 can have a predetermined level of power all the time.

The control unit 40 captures through the upper camera 30 the image of the ceiling where the location recognition mark is formed. Based on the upper images, current location of the robot cleaner 10 is calculated. A working path for the robot cleaner 10 is planned according to orders and thus, the robot cleaner 10 performs an assigned job while moving along the planned path.

The control unit 40 separates from the external recharging apparatus 80, operates as ordered, and then returns and docks with the external recharging apparatus 80 efficiently by using the upper images taken by the upper camera 30 and the recognition mark sensor 15.

The external recharging apparatus 80 includes the power terminal 82, and a terminal block 84. The power terminal 82 is connected to the power cord 86 through an internal transformer and a power cable, and docked with the recharging terminal 56 of the robot cleaner 10 to supply power to the rechargeable battery 50. The power cord 86 is connected to the utility AC power supply. The internal transformer may be omitted.

The terminal block 84 is for supporting the power terminal 82 at the same height as that of the recharging terminal 56 of the robot cleaner 10. The power terminal 82 is fixed in position on the terminal block 84. If it is the three-phase power that is supplied, there are three power terminals 82 being installed on the terminal block 84.

Figure 10:
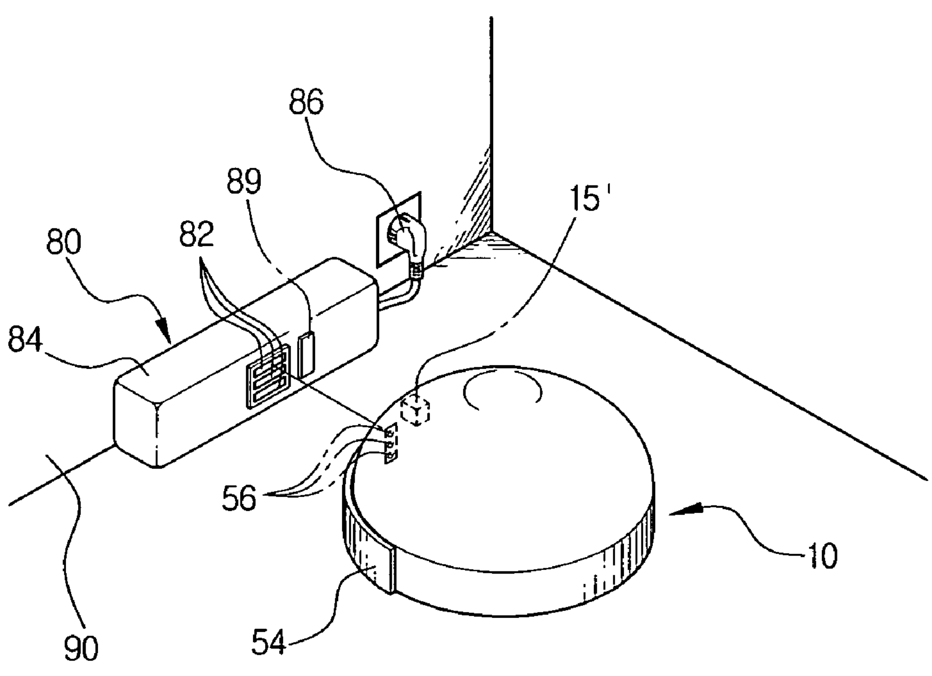
FIG. 10 is a perspective view of a robot cleaner system having an external recharging apparatus according to another preferred embodiment of the present invention.
Figure 11:
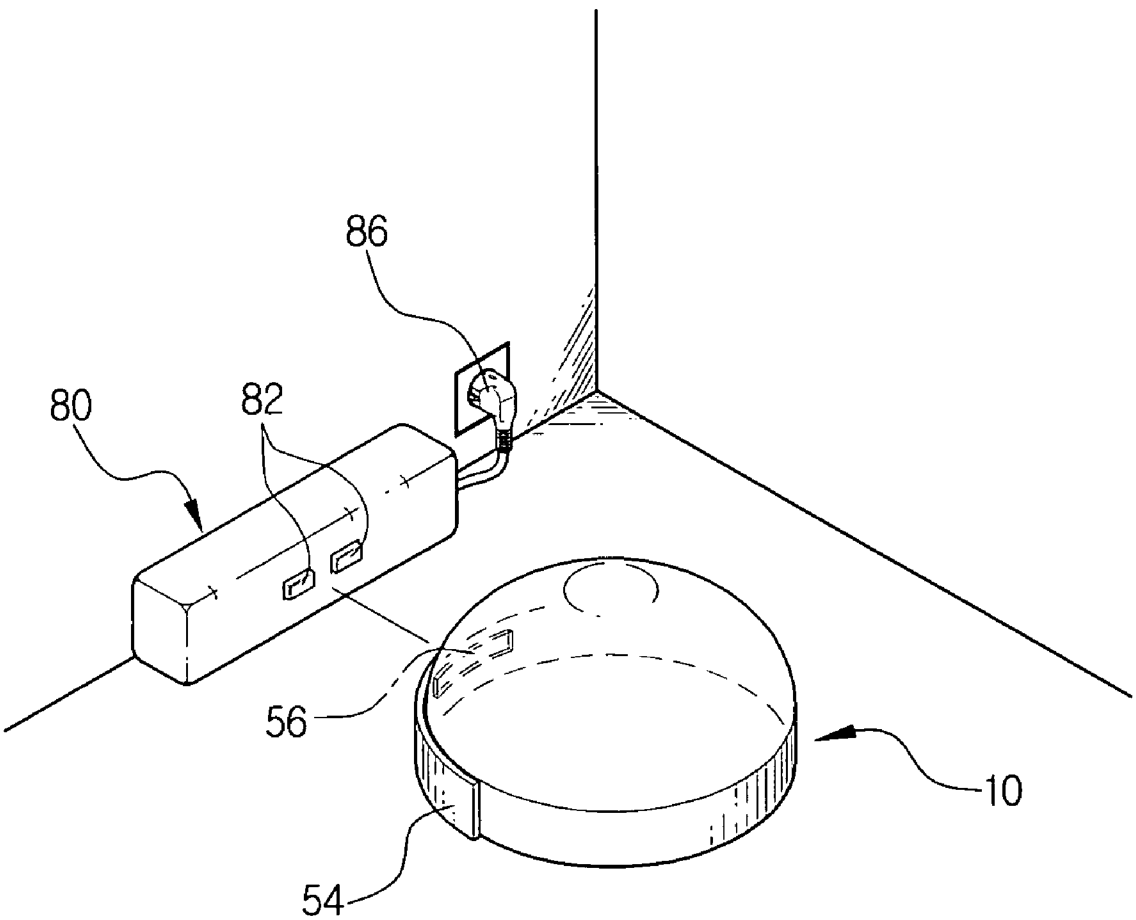
FIG. 11 is a perspective view of a robot cleaner having an external recharging apparatus according to yet another preferred embodiment of the present invention.
Figure 12:
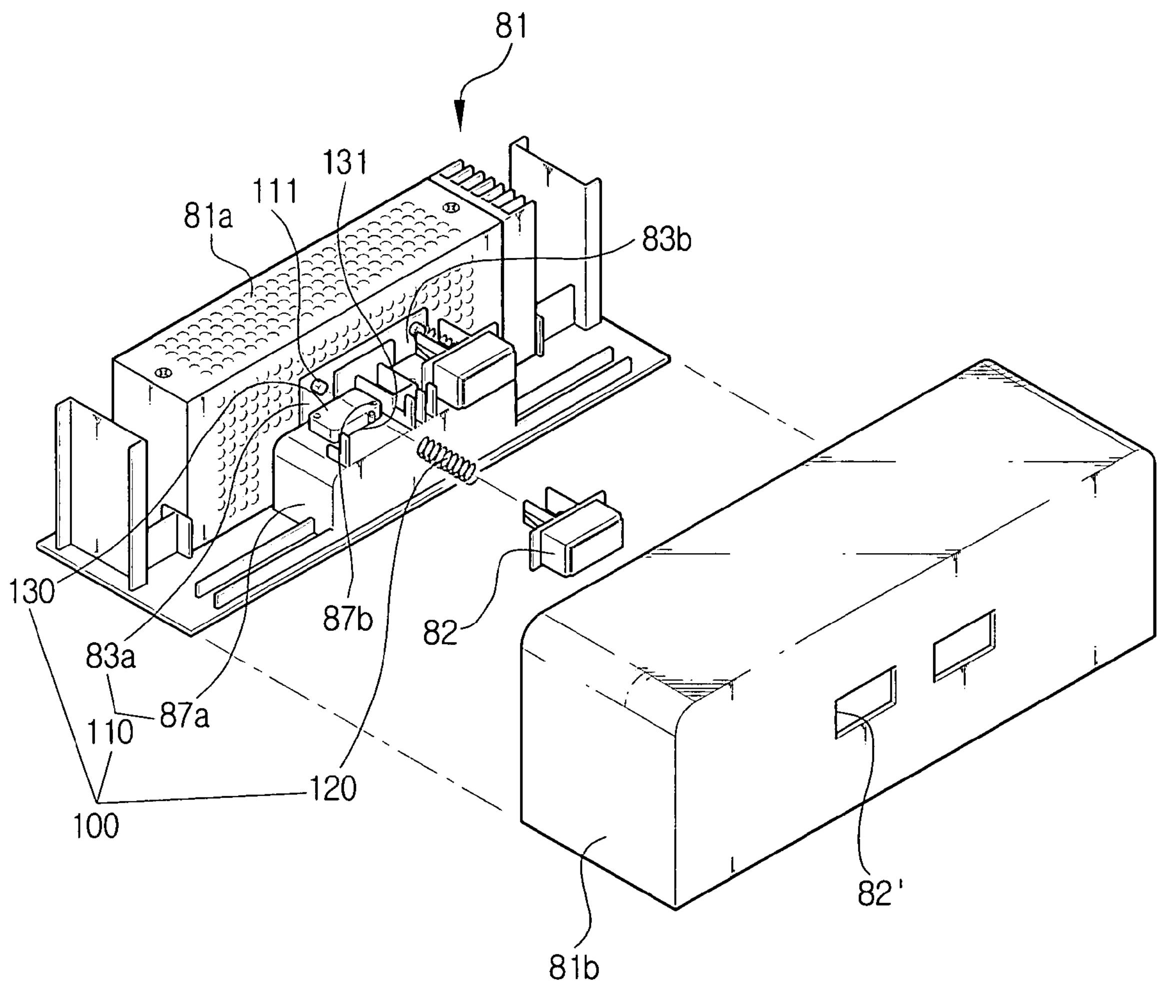
FIG. 12 is an exploded perspective view of the external recharging apparatus.
Figure 13:
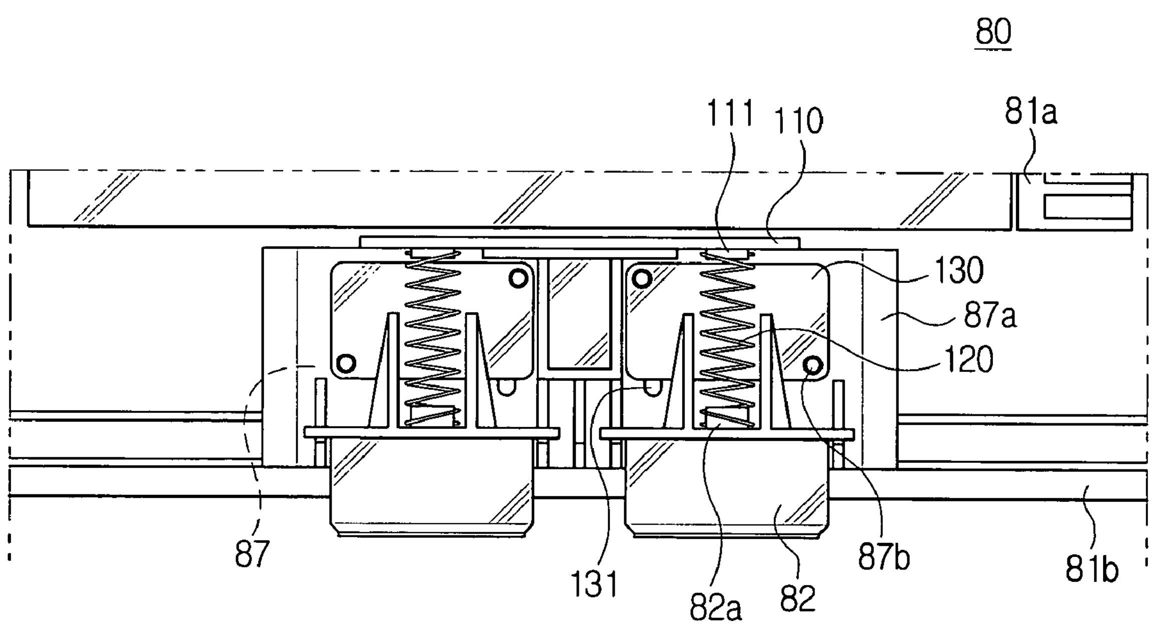
FIG. 13 is a plan view of FIG. 12.

The external recharging apparatus 80 includes a recharging apparatus body 81, a power terminal 82 and a power terminal control unit 100. As shown in FIGS. 1 and 10, the external recharging apparatus 80 may use three-phase power, or as shown in FIGS. 11–13, it may use a utility power supply of 100~240V. According to the present embodiment, the utility power supply is used as shown in FIGS. 11–13.

As shown in FIG. 12, the recharging apparatus body 81 includes a power cord 86 (FIG. 11) connected to the utility power supply, a recharging power device casing 87*a* in which the recharging power device 87 is installed, a heat discharger 81*a* for discharging the heat generated at the recharging power device 87, and a recharging apparatus casing 81*b*. The recharging apparatus casing 81*b* is provided with a terminal hole 82' through which the power terminal 82 is exposed outside.

The power terminal 82 is connected to the power cord 86 through the recharging power device 87 and the power cable, and connected to the recharging terminal 56 of the robot cleaner 10 to thereby supply power to the rechargeable battery 50. The type of power terminal 82 being employed is determined in accordance with the type of power used by the external recharging apparatus 80. For example, if three-phase induced power is used, three power terminals 82 may be provided as shown in FIG. 1, and if the utility power supply for domestic use is used, there are two power terminals 82 provided as shown in FIG. 11. The power terminal control unit 100 is connected to the power terminal 82 so that power is supplied only when the recharging terminal 56 of the robot cleaner 10 is connected with the power terminal 82.

The power terminal control unit 100 includes a power terminal supporting member 110, a resilient member 120 connected to a power terminal supporting member 110 with its one end, and to the power terminal 82 with its other end to resiliently support the power terminal 82, and a micro-switch 130 disposed between the power terminal 82 and the power terminal supporting member 110 operated in accordance with the position change of the power terminal 82.

The power terminal supporting member 110 supports the power terminal 82 at the same height as the recharging terminal 56 of the robot cleaner 10, and secures the power terminal 82 at a predetermined position. The power terminal supporting member 110 is provided with a support bracket 83*a* connected to the recharging apparatus body 81, and the recharging power device casing 87*a* which is formed at the lower surface of the support bracket 83*a* and includes a connecting protrusion 87*b* protruding from the upper surface for a connection with the micro-switch 130.

The resilient member 120 may preferably be a coil spring. One end of the resilient member 120 is connected to a first supporting protrusion 111 protruding from the power terminal supporting member 110, while the other end is connected to a second supporting protrusion 82*a* protruding from the inner side of the power terminal 82.

The micro-switch 130 is seated on the connecting protrusion 87*b* protruding from the upper side of the recharging power device casing 87*a*, with an on/off switch member 131 protruding from a contact area with one end of the power terminal 82. As the power terminal 82 overcomes the recovery force of the resilient member 120 to come into contact with the micro-switch 130, the switch member 131 is switched on, and thus permits the power to be supplied to the power terminal 82.

Figure 6:
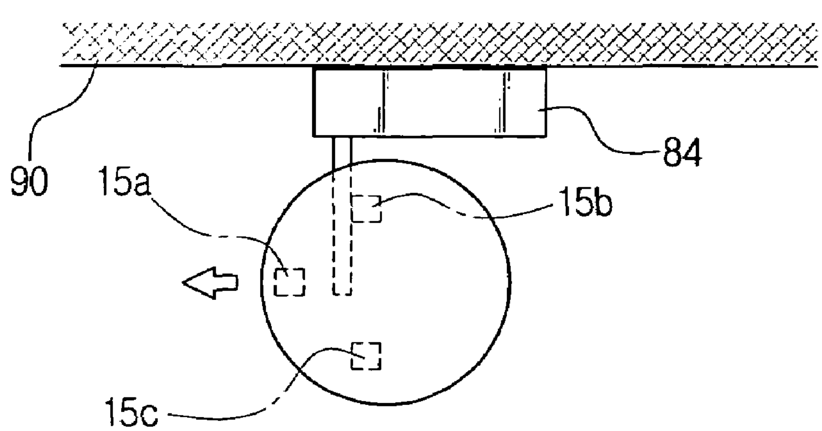
FIG. 6 is a view illustrating a method of the recognition mark detection sensor of the robot cleaner of FIG. 5, for detecting the recharging apparatus recognition mark.
Figure 8:
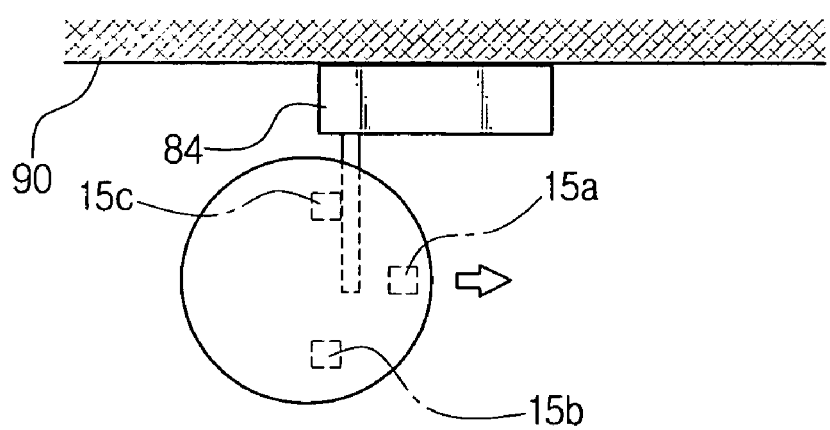
FIG. 8 is a view illustrating a method of the recognition mark detection sensor of the robot cleaner of FIG. 7 detecting a recharging apparatus recognition mark.

The recharging apparatus recognition mark 88 is formed on the floor ahead of the external recharging apparatus 80 so that the robot cleaner 10 can recognize the location of the external recharging apparatus 80 by using the recognition mark sensor 15 (see FIG. 1). Preferably, the recharging apparatus recognition mark 88 may be formed in perpendicular relation with respect to the external recharging apparatus 80 so that the recognition mark sensor 15 can detect the location of the external recharging apparatus 80 accurately. If the proximity sensor is used as the recognition mark sensor 15, it is preferable that the metal tape, which is detected by the proximity sensor, is used as the recharging apparatus recognition mark 88. The length of the recharging apparatus recognition mark 88 is determined to be long enough for at least two sensors of the plural recognition mark sensors 15*a*, 15*b*, 15*c* at the bottom of the body 11 to detect the recharging apparatus recognition mark 88 when the robot cleaner 10 is in wall-follow driving along the external recharging apparatus 80. For example, as shown in FIGS. 6 and 8, for the robot cleaner 10 having three recognition mark sensors 15*a*, 15*b*, 15*c*, it is set such that two sensors 15*a* and 15*b*, or 15*a* and 15*c* out of three sensors can detect the recharging apparatus recognition mark 88.

Referring to FIG. 13, the recharging apparatus recognition mark 89 according to another preferred embodiment of the present invention is disposed on the front of the terminal block 84 of the external recharging apparatus 80 to recognize the position of the external recharging apparatus 80 using the recognition mark sensor 15'. 'Retroreflective material' directly returns the incident light from the light source regardless of the incident angle. Accordingly, the recharging apparatus recognition mark 89 reflects the light from the recognition mark sensor 15' of the robot cleaner 10 back to the recognition mark sensor 15'. Thus, the robot cleaner 10 can detect the external recharging apparatus 80 anywhere in the cleaning area as long as the robot cleaner 10 is within the angle that the light from the recognition mark sensor 15' is reflected to the recharging apparatus recognition mark 89.

Described now with reference to FIGS. 1–9 will be the process of the robot cleaner system, in which the robot cleaner 10 detects the location of the external recharging apparatus 80 and docks with the power terminal 82.

In the initial state of the robot cleaner system having the external recharging apparatus 80, the robot cleaner 10 is in standby mode, with the recharging terminal 56 thereof connected with the power terminal 82 of the external recharging apparatus 80. The external recharging apparatus 80 is in a place where the upper camera 30 of the robot cleaner 10 is incapable of detecting the location recognition mark on the ceiling. More specifically, if dividing the working area into a camera region A where the location recognition mark can be detected by the upper camera 30, and a non-camera region B where the location recognition mark cannot be detected (see FIG. 5), the external recharging apparatus 80 is in the non-camera region B.

With the reception of a work start command, the robot cleaner 10 moves forward, disconnected from the external recharging apparatus 80, and captures images of the ceiling through the upper camera 30. The robot cleaner 10 sensing a location recognition mark (not shown) calculates corresponding coordinates of that spot from the upper images and stores the calculated coordinates in the memory unit 41. In this instance, the robot cleaner 10 calculates a coordinate for the spot P1 (FIG. 5) where the robot cleaner 10 leaves the non-camera region B and enters the camera region A and then stores the calculated coordinate. In the following, the spot P1 where the robot cleaner 10 first enters the camera region A will be referred to as an entry spot. The work start command includes a cleaning job, or security job using the camera.

Performing the assigned jobs according to orders, the robot cleaner 10 periodically checks whether a recharge command signal is received or not.

With the reception of a recharge command signal, the control unit 40 of the robot cleaner 10 captures current upper images and calculates a current location of the robot cleaner 10 based on the captured images. The control unit 40 loads the stored coordinate information of the entry spot P1, and calculates an optimum path to the entry spot P1. The control unit 40 directs the driving unit 20 to drive the robot cleaner 10 along the optimum path as found.

The recharge command signal is generated when the robot cleaner 10 is finished with the job, or receives an input of a recharge request signal from the battery power measuring unit 52. Furthermore, an operator may force the recharge command signal to be generated any time he/she wants during operation of the robot cleaner 10.

Figure 5:
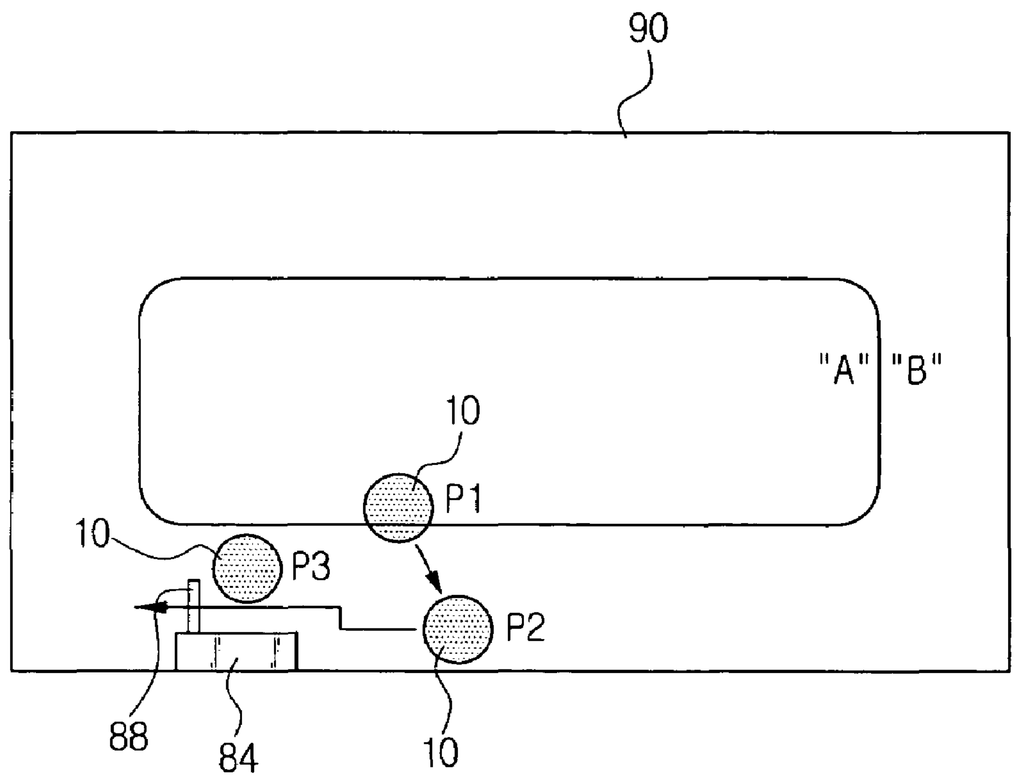
FIG. 5 is a view illustrating the robot cleaner moving clockwise to find the external recharging apparatus.
Figure 15:
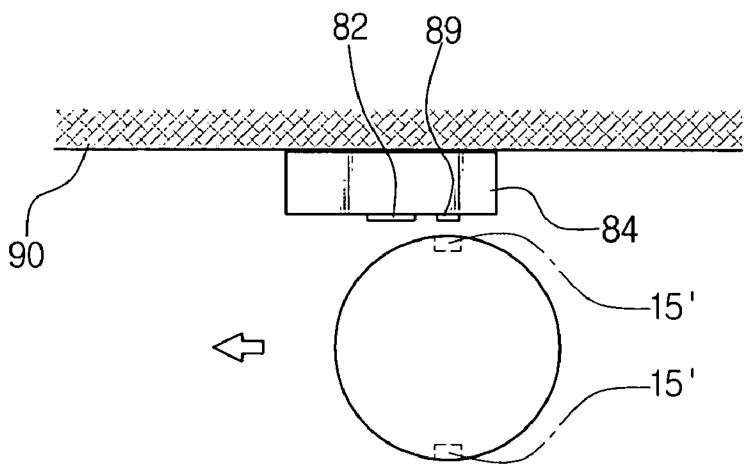
FIG. 15 is a view illustrating a method for sensing the external recharging apparatus recognition mark through the recognition mark sensor disposed at both sides of the body.

As the robot cleaner 10 reaches the entry spot P1, the control unit 40 controls the driving unit 20 so that the robot cleaner 10 moves towards the wall 90. This is because the robot cleaner 10, in the non-camera region B, does not know its current location through the upper camera 30. Upon sensing the wall 90 through the obstacle sensor 14, the robot cleaner 10 stops at a second spot P2 which is distanced apart from the wall 90 by a predetermined distance, and runs counterclockwise along the wall 90 as shown in FIG. 5. Accordingly, the robot cleaner 10 is wall-follow driven. The running direction of the robot cleaner 10 along the wall 90 and a gap between the running robot cleaner 10 and the wall 90 is adjustable by the operator. The control unit 40 controls wall-follow driving, and determines if the recharging apparatus recognition mark 88 is detected by the recognition mark sensor 15. When the sensing signal in proximity to the recharging apparatus recognition mark 88 is received from the recognition mark sensor 15, the control unit 40 causes the robot cleaner 10 to stop the wall-follow driving and dock in the external recharging apparatus 80. The control unit 40 determines that the recharging apparatus recognition mark 88 is detected when certain conditions are met, for example, when the front sensor 15*a* of the three recognition mark sensors 15*a*, 15*b*, 15*c* is turned on, and then, one of the rest sensors 15*b*, 15*c* is turned on within a predetermined time interval (see FIG. 6). Referring to FIG. 15, according to another preferred embodiment of the present invention, when one of the recognition mark sensors 15' on both sides of the body is turned on, it is determined that the recharging apparatus recognition mark 89 is detected.

Figure 7:
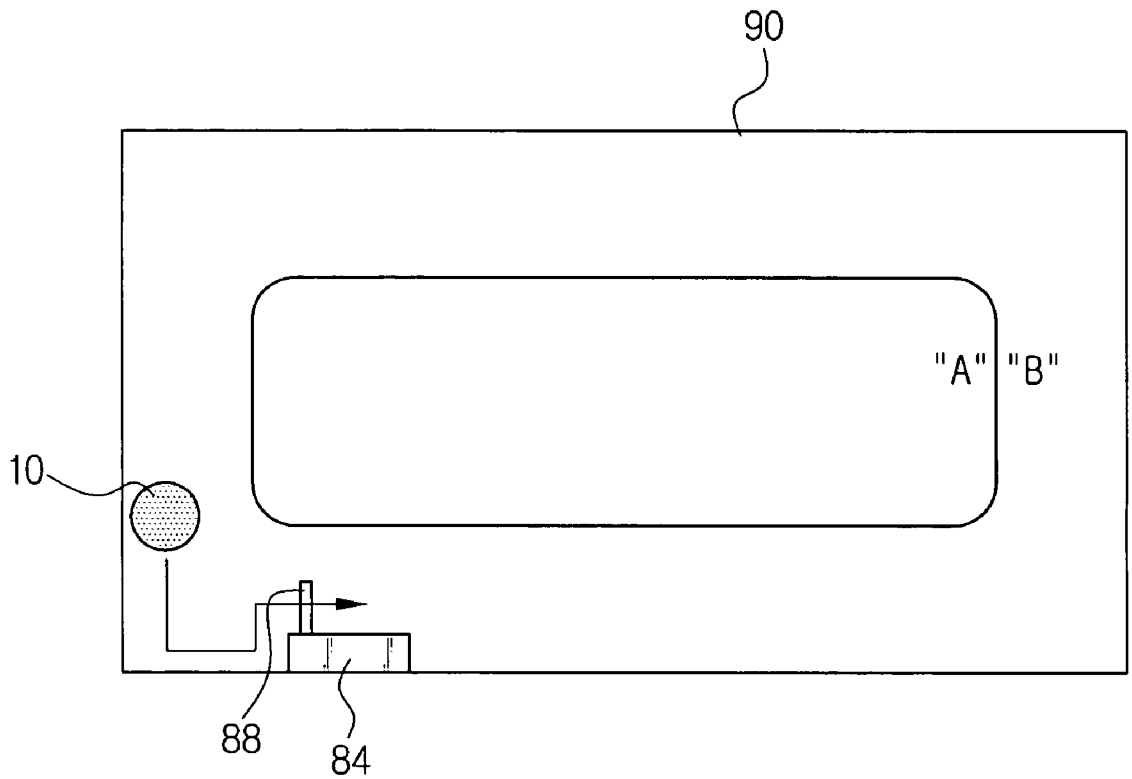
FIG. 7 is a view illustrating the robot cleaner of FIG. 1 moving counterclockwise, searching for, an external recharging apparatus.

If the robot cleaner 10 does not detect the recharging apparatus recognition mark 88 within a predetermined time after the initiation of the wall-follow driving, the control unit 40 causes the robot cleaner 10 to turn by 180°, and perform wall-follow driving in the direction opposite to the previous running (see FIG. 7). If the robot cleaner 10 detects the recharging apparatus recognition mark 88 through the recognition mark sensor 15 during wall-follow driving, the control unit 40 causes the robot cleaner 10 to stop the wall-follow, and dock in the external recharging apparatus 80. The control unit 40 determines that the recharging apparatus recognition mark 88 is detected when certain conditions are met, for example, when the front sensor 15*a* of the three recognition mark sensors 15*a*, 15*b*, 15*c* is turned on, and one of the remaining sensors 15*b*, 15*c* is turned on within a predetermined time interval (see FIG. 8). Referring again to FIG. 15, according to another preferred embodiment of the present invention, when one of the recognition mark sensors 15' at both sides of the body is turned on, it is determined that the recharging apparatus recognition mark 89 is detected.

A docking method for the robot cleaner 10 to dock in the external recharging apparatus 80 will be described below.

When the recharging apparatus recognition mark 88 is detected, the robot cleaner 10 moves towards a docking spot P3, and turns so that the recharging terminal 56 of the bumper 54 faces the power terminal 82 of the external recharging apparatus 80. The docking spot P3 is predetermined based on the geometric relation of the power terminal 82 of the external recharging apparatus 80 and the recharging apparatus recognition mark 88. When the robot cleaner 10 reaches the docking spot P3, the control unit 40 controls so that the robot cleaner 10 runs towards the external recharging apparatus 80.

With the reception of the collision signal from the bumper 54, the control unit 40 determines whether there is a signal received from the recharging terminal 56 near the contact with the power terminal 82. When the collision signal of the bumper 54 and the contact signal of the recharging terminal 56 are received concurrently, the control unit 40 determines that the recharging terminal 56 is completely connected to the power terminal 82 of the external recharging apparatus 80, and controls the robot cleaner 10 to advance until the bumper 54 is pressed to some extent. With this, docking is completed.

If there is no contact signal received after the reception of the collision signal, the control unit 40 determines that the recharging terminal 56 is not connected with the power terminal 82 of the external recharging apparatus 80. The situation where there is the reception of collision signal but no contact signal is shown in FIG. 9.

Figure 9:
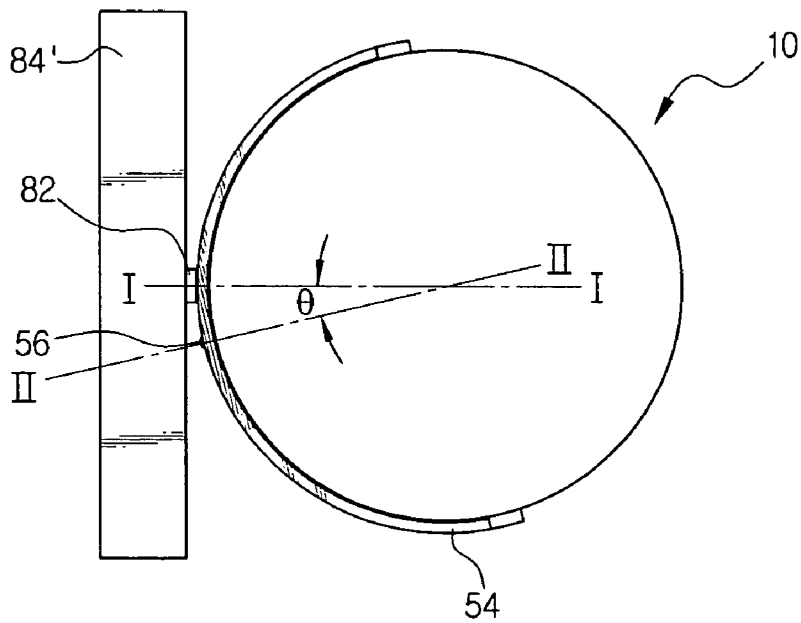
FIG. 9 is a view illustrating the robot cleaner system of FIG. 1, in which the power terminal of the external recharging apparatus is not in contact with the recharging terminal of the robot cleaner.

Referring to FIG. 9, misalignment by an angle θ between a first line I—I connecting the centers of the power terminal 82 and the robot cleaner 10 and a second line II—II connecting the centers of the recharging terminal 56 and the robot cleaner 10 means that the power terminal 82 is not connected with the recharging terminal 56. Accordingly, the control unit 40 controls the driving unit 20 so that the robot cleaner 10 moves in the opposite direction for a predetermined distance until the collision signal is off, turns at a predetermined angle, and then moves forward straightly.

After the rotation by the predetermined angle, with the reception of the collision signal from the bumper 54 and the contact signal from the recharging terminal 56, the control unit commands the robot cleaner 10 to move forward in the new direction, and determines that a connection is completed.

When there is no contact signal from the recharging terminal 56 after the turning at predetermined angle, the control unit 40 adjusts a running angle of the robot cleaner 10. If the control unit 40 does not receive contact signal from the recharging terminal 56 after a predetermined number of attempts, the control unit 40 commands the robot cleaner 10 to return to the entry spot P1. The control unit 40 repeats the above processes until the collision signal and the contact signal are concurrently received. When the collision signal and the contact signal are concurrently received, the control unit 40 commands the robot cleaner 10 to move forward for a predetermined distance, and completes the connection.

The adjustment to the running angle may be determined in consideration of the size of the power terminal 82 of the external recharging apparatus 80 and the recharging terminal 56 of the robot cleaner 10, but the most preferable angle is 15°. The number of adjustments can be determined appropriately considering the adjustment angle. Preferably, the running angle is adjusted several times from the initial state, and if there is no contact signal received, the robot cleaner 10 is returned to the initial state, and then the running angle is adjusted in the reverse direction. Furthermore, it is preferable that, if the adjustment angle is set at 15°, the running angle is adjusted three times each time by 15°, and if there is no contact signal, the running angle is adjusted three times in the reverse direction each time by 15°. As a result, the robot cleaner 10 attempts connection with the power terminal 82 left and right within 45° from the initial contact with the external recharging apparatus 80, and most of the times, the contact signal from the recharging terminal 56 is received by this method.

In still another embodiment of the present invention, the recognition mark sensor 15 may be formed on the front side of the body 11 of the robot cleaner 10 and, the process in which how the robot cleaner 10 is instructed to detect the external recharging apparatus 80 will be described below with reference to FIG. 13.

Figure 16:
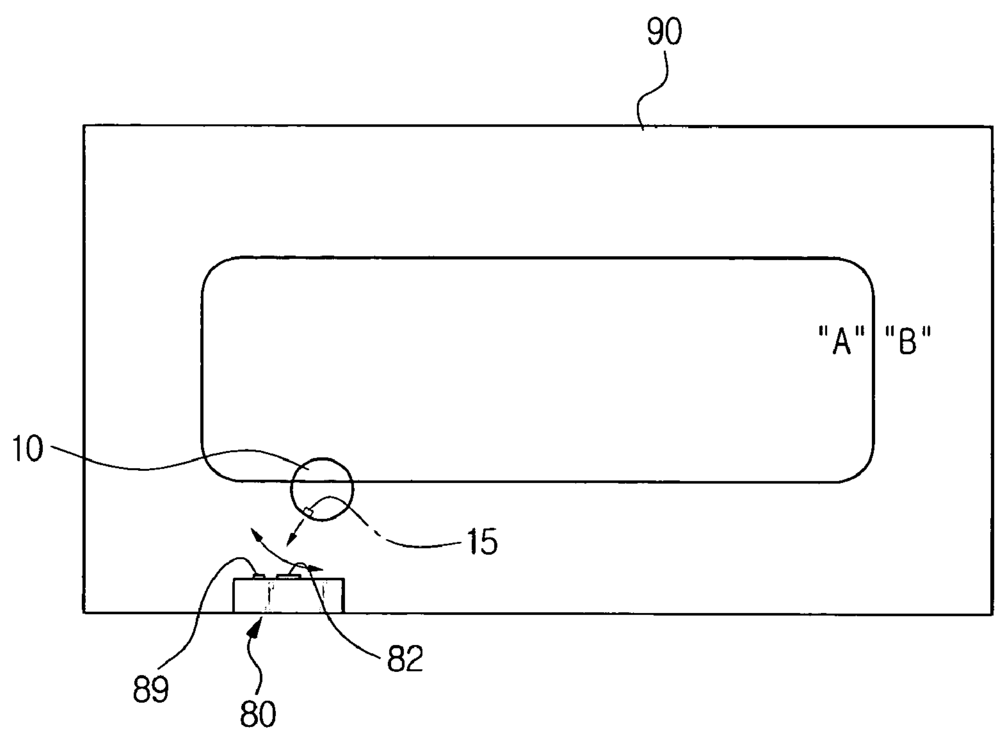
FIG. 16 is a view illustrating the process of the robot cleaner of FIG. 14B in advancing movement searching out the external recharging apparatus.
Figure 17:
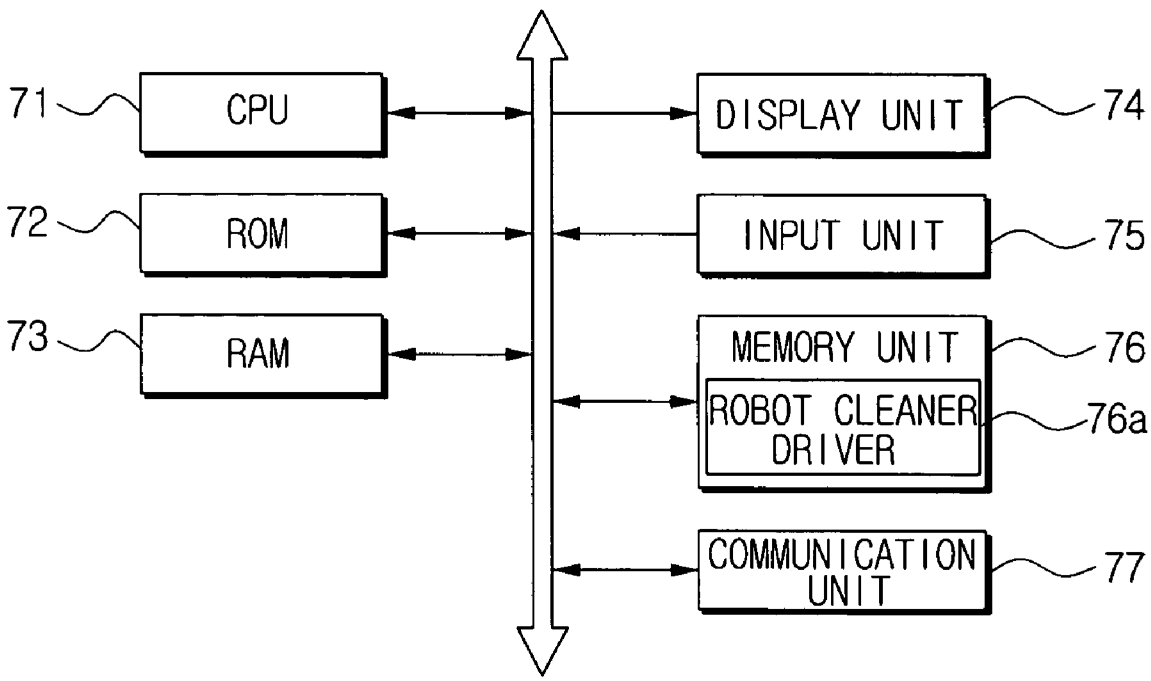
FIG. 17 is a block diagram of the central control unit of FIG. 2 according to one preferred embodiment of the present invention.

The robot cleaner 10 moves to the entry spot P1 through the same processes as described above. The robot cleaner 10 is separated from the external recharging apparatus 80 and reaches the entry spot P1, in the same position. Referring to FIG. 16, as the robot cleaner 10 reaches the entry spot P1, the control unit 40 rotates the robot cleaner 10 by a predetermined angle with respect to the front side where the recharging terminal 56 is installed. When the recognition mark sensor 15' is operated during the rotation of the robot cleaner 10, the control unit 40 stops the robot cleaner 10 and directs the robot cleaner 10 to the direction where the recognition mark sensor 15' is turned on. As a result, the robot cleaner 10 is docked in the external recharging apparatus 80. Since the process of the robot cleaner 10 docking into the external recharging apparatus 80 is identical with the process that was described above, further description thereof will be omitted.

Described so far, by way of an example, was the control unit 40 automatically processing computations for detecting and docking to the external recharging apparatus 80.

According to another aspect of the present invention, the robot cleaner system may be constructed such that storage of the upper images of the entry spot P1 and connection of the robot cleaner 10 are performed by an external control unit. This aspect is aimed to reduce the computational requirements of the robot cleaner 10 for controlling the detection and docking with the external recharging apparatus 80.

To this end, the robot cleaner 10 wirelessly transmits the upper images captured by the upper camera 30, and driven in accordance with the control signal externally received. There is a remote controller 60 that wirelessly controls the robot cleaner 10 on the processes, including carrying out an assigned job and returning to the external recharging apparatus 80.

The remote controller 60 includes a wireless relay 63 and a central control apparatus 70.

The wireless relay 63 processes the wireless signal received from the robot cleaner 10, transmits the received signal to the central control apparatus 70 through wire, and wirelessly sends out the signal received from the central control apparatus 70 to the robot cleaner 10 through an antenna 62.

A computer is usually used as the central control apparatus 70, and one example of the same is illustrated in FIG. 14. Referring to FIG. 14, the central control apparatus 70 includes a central processing unit (CPU) 71, a read only memory (ROM) 72, a random access memory (RAM) 73, a display 74, an input unit 75, a memory unit 76 and a communication unit 77.

The memory unit 76 is installed with a robot cleaner driver 76*a* to control the robot cleaner 10 and process the signal transmitted from the robot cleaner 10.

Once executed, the robot cleaner driver 76 processes such that a control menu for the robot cleaner 10 is displayed on the display 74, and a selection on the control menu made by the operator can be carried out by the robot cleaner 10. The menu may contain various menus, in a main menu such as a cleaning item and a security item, and a sub-menu such as a working area selection list, a working method selection list, or the like.

When it is a predetermined working period, or when the work start command signal is input by the operator through the input unit 75, the robot cleaner 10 is separated from the external recharging apparatus 80 and the upper images, i.e., images of the ceiling are captured by the upper camera 30 of the robot cleaner 10. Accordingly, the robot cleaner driver 76*a* receives the upper images from the robot cleaner 10, and determines whether the location recognition mark is detected or not. If it is the first time that the location recognition mark is detected from the upper images, the robot cleaner driver 76*a* calculates data about the location of the robot cleaner 10 where the location recognition mark is detected, and stores the calculated data in the memory unit 76 as an entry spot.

The robot cleaner driver 76*a* commands the robot cleaner 10 to perform the assigned job. The control unit 40 of the robot cleaner 10 controls the driving unit 20 and/or dust suction unit 16 in accordance with the control information transmitted to the robot cleaner driver 76*a* through the wireless relay 63, and transmits the upper images currently captured by the upper camera 30 to the central controlling apparatus 70 through the wireless relay 63.

When a battery recharge request signal is received from the robot cleaner 10, or a recharge command signal such as a job completion signal is received through the wireless relay 63, the robot cleaner driver 76*a* calculates a return path to the external recharging apparatus 80 using the entry spot information stored in the memory unit 76 and the current location information obtained from the upper images captured and received from the upper camera 30, and thus, commands the robot cleaner 10 to move to the entry spot along the calculated return path. The robot cleaner driver 76*a* controls the robot cleaner 10 in the process described earlier so that the robot cleaner 10 can dock in the external recharging apparatus 80.

Figure 18:
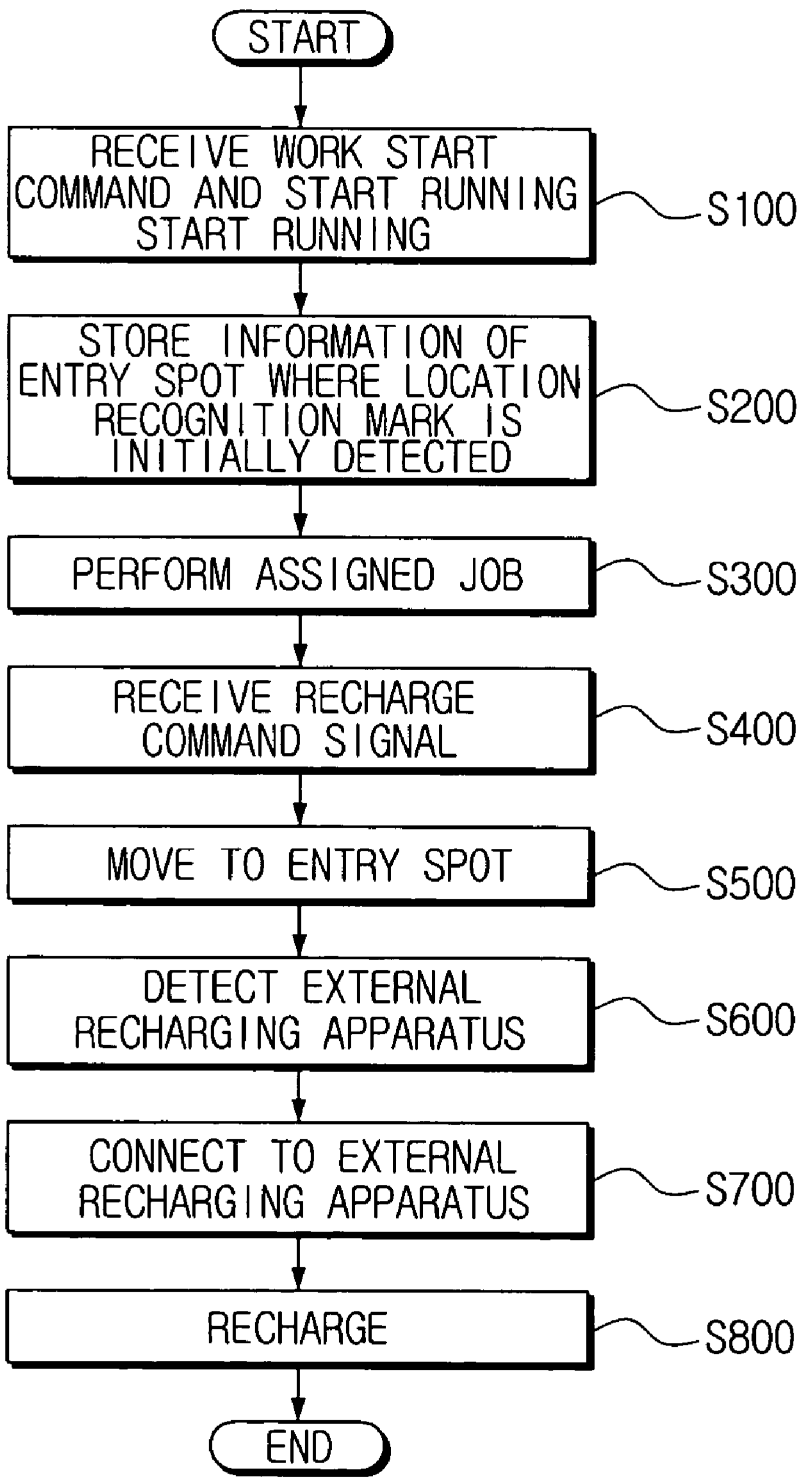
FIG. 18 is a flowchart illustrating a method of the robot cleaner system of FIG. 1, for docking the robot cleaner with the external recharging apparatus.

Below, a docking method of the robot cleaner system having the external recharging apparatus according to the preferred embodiment of the present invention, i.e., a docking method for the robot cleaner 10 docking in the external recharging apparatus 80, will be described with reference to FIGS. 18–20.

In this instance, the robot cleaner 10 is initially in a standby mode in connection with the external recharging apparatus 80.

As the work start command is received, the control unit 40 controls the robot cleaner 10 to move forward off from the external recharging apparatus 80. The robot cleaner 10 at operation S100 continuously captures upper images through its upper camera 30 while it is running.

Upon detecting the first location recognition mark among the upper images, the control unit 40 at operation S200 stores the coordinate of the robot cleaner 10 in that spot in the memory unit 41 as an entry spot P1.

The robot cleaner 10 performs an assigned job such as cleaning or security at operation S300.

While the assigned job is carried out, the control unit 40 at operation S400 determines whether or not the recharge command signal is.

With the reception of the recharge command signal, the control unit 40 captures upper images through the upper camera 40, calculates information on current location of the robot cleaner 10, and with the information of the current location and the stored location information of the entry spot P1, the control unit 40 calculates a return path for the robot cleaner 10 to the entry spot P1. At operation S500, the control unit 40 controls the robot cleaner 10 to run along the calculated return path.

As the robot cleaner 10 is moved to the entry spot P1, the control unit 40 at operation S600 takes over and the robot cleaner 10 detects the external recharging apparatus 80. A detection method of the robot cleaner 10 for detecting the external recharging apparatus 80 is illustrated in FIG. 19.

Figure 19:
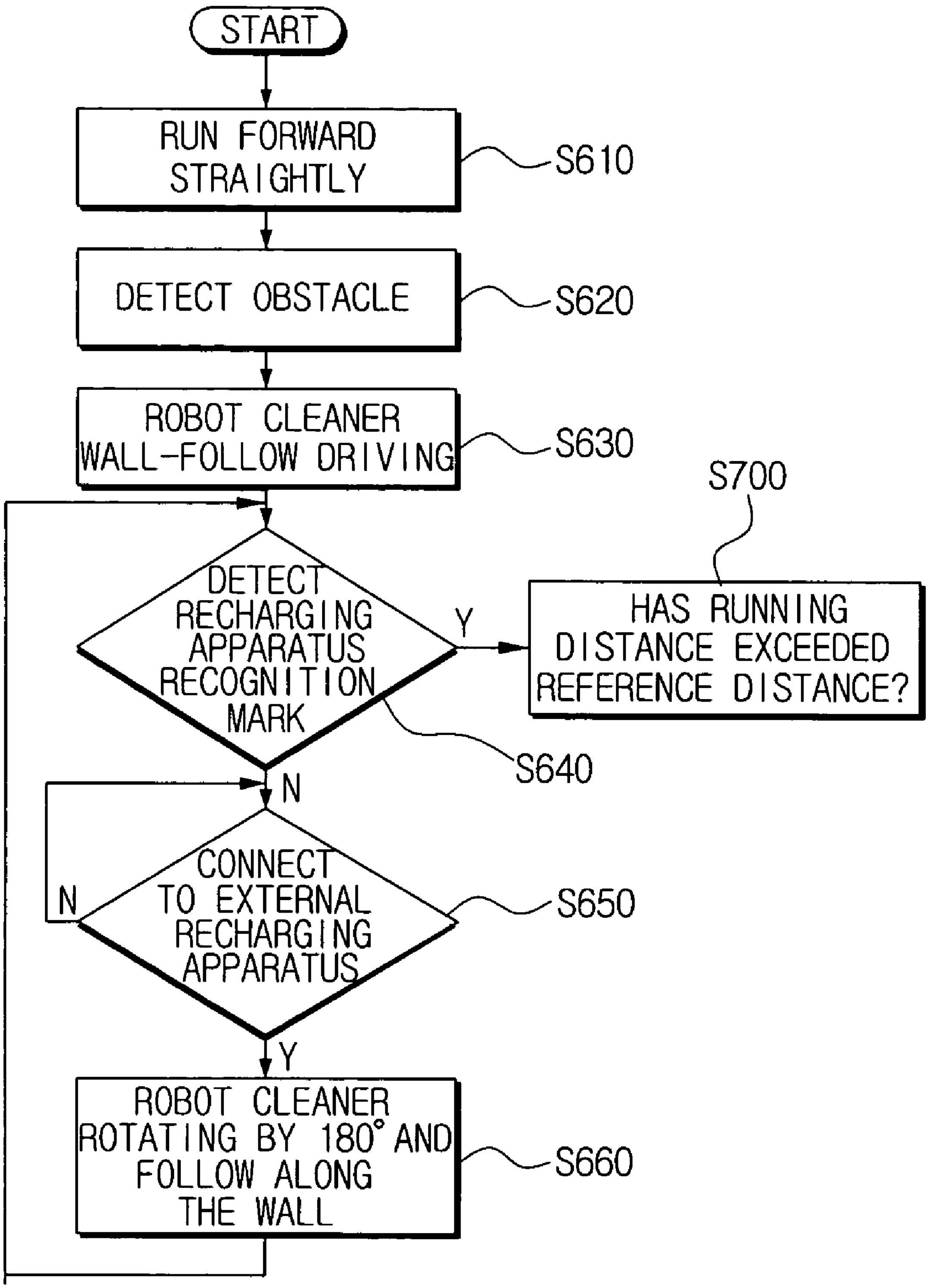
FIG. 19 is a flowchart illustrating a process of detecting the external recharging apparatus of FIG. 18 according to a preferred embodiment of the present invention.

Referring to FIG. 19, the control unit 40 at operation S610 commands the robot cleaner 10 to move straight towards the wall 90. At operation S620, it is determined whether there is an obstacle detection signal received from the obstacle sensor 14 during running. If any obstacle is detected, the control unit 40 at operation S630 commands the robot cleaner 10 to wall-follow drive along the obstacle in a predetermined direction. The control unit 40 at operation S640 determines whether there is any detection signal at the recharging apparatus recognition mark 88 received from the recognition mark sensor 15 during the wall-follow driving of the robot cleaner 10. When a detection signal at the recharging apparatus recognition mark 88 is received, the control unit 40 at operation S700 signals the robot cleaner 10 to dock in the external recharging apparatus.

If there is no detection signal at recharging apparatus recognition mark 88 received, the control unit 40 at operation S650 determines whether or not the distance of the wall-follow driving of the robot cleaner 10 exceeds a predetermined reference. The predetermined reference refers to a distance that was set by an operator with reference to the external recharging apparatus 80 to prevent the robot cleaner 10 from moving in the wall-follow driving along the entire working area.

If the moving distance of the wall-following robot cleaner 10 has exceeded the predetermined reference, the control unit 40 at operation S660 signals the robot cleaner 10 to turn by 180° and then resume wall-follow driving. When the recharging apparatus recognition mark 88 is detected during wall-follow driving, the control unit 40 signals the robot cleaner 10 to connect to the external recharging apparatus 80.

Figure 20:
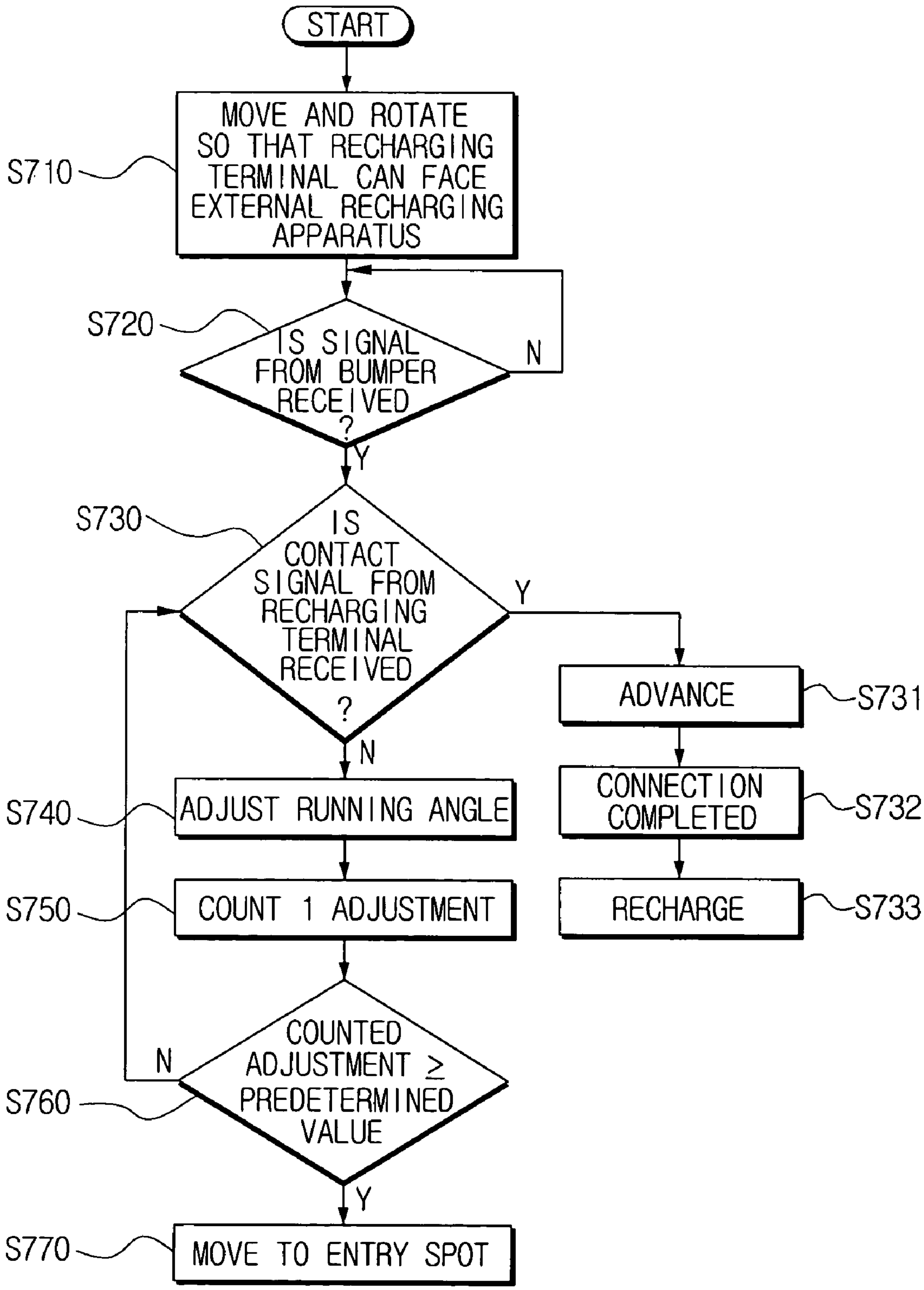
FIG. 20 is a flowchart illustrating a process of docking the robot cleaner with the external recharging apparatus of FIG. 19 according to a preferred embodiment of the present invention.

FIG. 20 is a flowchart illustrating a docking method of the robot cleaner 10 with the external recharging apparatus 80 according to the preferred embodiment of the present invention.

Referring to FIG. 20, the control unit 40 at operation S710 signals the robot cleaner to move and rotate about the spot from where the recharging apparatus recognition mark 88 is detected, so that the recharging terminal 56 can face the external recharging apparatus 80. That is, the control unit 40 signals the robot cleaner 10 to move with respect to the recharging apparatus recognition mark 88 in a predetermined direction and to a predetermined position. Then the control unit 40 signals the robot cleaner 10 to move forward. Next, the control unit 40 at operation S720 determines if any collision signal is received from the bumper 54.

If the collision signal is received, the control unit 40 at operation S730 determines whether there is a contact signal received from the recharging terminal 56. If there is no contact signal received from the recharging terminal 56 at operation S730, the control unit 40 at operation S740 signals the robot cleaner 10 to retreat for a predetermined distance, and then adjusts the running angle of the robot cleaner 10 by a predetermined degree. Since the robot cleaner 10, whose recharging terminal 56 has been determined as not connected with the power terminal 82, is made to change its direction by a predetermined angle and then move directly forward, the possibility that the recharging terminal 56 contacts with the power terminal 82 increases.

The adjustment of a running angle can be made in one direction, but it is more preferable that the adjustment is made bi-directionally. Accordingly, if a contact signal is not received after several adjustments in one direction, the adjustment can be made in the opposite direction by predetermined times. For example, if the contact signal is not received even after the robot cleaner 10 has adjusted the running angle three times in the leftward direction, each time by 15°, the robot cleaner 10 is returned to the initial state, and then adjusts the running angle three times in the rightward direction each time by 15°.

Each time the robot cleaner 10 adjusts the running angle, one adjustment is counted at operation S750. Then at operation S760, it is determined whether the counted value is below a predetermined number of adjustment. If it is, control is returned to the operation S730 which determines whether the contact signal is received from the recharging terminal 56 or not. As for the predetermined number of adjustment, it is preferably set to '6 times' based on the assumption that the adjustment angle in the operation S740 is set to '15°'.

When it is finally determined in the operation S730 that the contact signal of the recharging terminal 56 is received, the robot cleaner 10 is moved in the determined direction for a predetermined distance at operation S730, and starts recharging at operation S733, determining at operation S732 that the recharging terminal 56 of the robot cleaner 10 is completely connected with the power terminal 82 of the external recharging apparatus 80.

With the robot cleaner system having an external recharging apparatus according to the present invention described above, the external recharging apparatus is accurately found even when the external recharging apparatus is in the area where is not detectable by the upper camera, i.e., in the non-camera region, and as a result, the robot cleaner is always docked with the external recharging apparatus accurately.

Although the present invention has been described above with reference to the robot cleaner, it is only by way of an example, and therefore, one will understand that the present invention is applicable to all types of robots that have a rechargeable battery, moving automatically with the power of the rechargeable battery and performing an assigned job, and also automatically returning to the external recharging apparatus whenever the need for recharging arises.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A robot cleaner system, comprising:

an external recharging apparatus comprising a power terminal connected to a utility power supply;

a recharging apparatus recognition mark formed on the external recharging apparatus;

a robot cleaner having a recognition mark sensor that detects the recharging apparatus recognition mark and a rechargeable battery, the robot cleaner automatically docking to the power terminal to recharge the rechargeable battery; and a power terminal control unit installed in the external recharging apparatus, for supplying power only during recharging of the robot cleaner.

2. The robot cleaner system of claim 1, wherein the power terminal control unit comprises:

a power terminal supporting member;

a resilient member connected by one end to the power terminal supporting member and connected by the other end to the power terminal, for resiliently supporting the power terminal; and a micro-switch disposed between the power terminal and the power terminal supporting member, operating in accordance with a position change of the power terminal.

3. The robot cleaner system of claim 2, wherein the power terminal supporting member comprises:

a support bracket connected to a body of the external recharging apparatus; and a recharging power supply device casing formed at a lower surface of the support bracket, and having a connection protrusion protruding from an upper surface for a connection with the micro-switch.

4. The robot cleaner system of claim 1, wherein the recharging apparatus recognition mark is formed on a side of the power terminal.

5. The robot cleaner system of claim 4, wherein the recharging apparatus recognition mark is made of a retroreflective material, and the recognition mark sensor is a photosensor that can detect the retroreflective material.

6. The robot cleaner system of claim 1, wherein the recharging apparatus recognition mark is formed on a floor in front of the external recharging apparatus.

7. The robot cleaner system of claim 6, wherein the recharging apparatus recognition mark is a metal tape, and the recognition mark sensor is a proximity sensor capable of detecting the metal tape.

8. A robot cleaner system, comprising:

an external recharging apparatus comprising, a power terminal connected to a utility power supply, a terminal block having the power terminal installed thereon, being disposed stationary in a predetermined location, and a recharging apparatus recognition mark formed on a bottom ahead of the terminal block;

a robot cleaner comprising, a recognition mark sensor formed on a bottom of a robot cleaner body to detect the recharging apparatus recognition mark, a driving unit for moving the robot cleaner body, an upper camera mounted on the robot cleaner body to capture images of a ceiling, a bumper mounted on an outer circumference of the robot cleaner body, to output a collision signal when the robot cleaner collides with an obstacle, a recharging terminal mounted on the bumper, connectible with the power terminal, a rechargeable battery mounted on the robot cleaner body, recharged with a power fed through the recharging terminal, and a control unit, upon a reception of a recharging command, detecting the recharging apparatus recognition mark by using the recognition mark sensor, and controlling the driving unit to connect to the external recharging apparatus.

9. The robot cleaner system of claim 8, wherein the recharging apparatus recognition mark is formed in a perpendicular relation with respect to the terminal block.

10. The robot cleaner system of claim 9, wherein the recognition mark sensor is mounted on the bottom of the robot cleaner body in a direction where the bumper is mounted.

11. The robot cleaner system of claim 10, wherein the recognition mark sensor comprises three sensors.

12. The robot cleaner system of claim 10, wherein the recharging apparatus recognition mark is a metal tape, and the recognition mark sensor is a proximity sensor capable of detecting the metal tape.

13. The robot cleaner system of claim 8, wherein the control unit determines the recharging terminal to be connected with the power terminal only when there is a collision signal received from the bumper, and a contact signal indicating contact between the recharging terminal and the power terminal.

14. The robot cleaner system of claim 8, wherein the robot cleaner further comprises a battery power measuring unit that detects remaining power of the rechargeable battery, and with a reception of a recharging request signal from the battery power measuring unit, the robot cleaner stops performing an assigned job and returns to the external recharging apparatus.

15. The robot cleaner system of claim 8, wherein the robot cleaner returns to the external recharging apparatus when an assigned job is completed.

16. A robot cleaner system, comprising:

a power terminal connected to a utility power supply;

an external recharging apparatus having the power terminal installed thereon, and a terminal block secured in a predetermined position;

a recharging apparatus recognition mark formed on a side of the power terminal in a front of the terminal block; and a robot cleaner comprising, a recognition mark sensor disposed on a body of the robot cleaner to detect the recharging apparatus recognition mark, a driving portion for driving the body of the robot cleaner, an upper camera mounted on the body of the robot cleaner to take images of ceiling, a bumper mounted on an outer circumference of the body of the robot cleaner to output a collision signal in the case of collision with an obstacle, a recharging terminal formed on the bumper in a connectible manner with the power terminal, a rechargeable battery mounted on the body of the robot cleaner, charged with electricity through the recharging terminal, and a control unit, upon reception of a recharging command, for detecting the recharging apparatus recognition mark by using the recognition mark sensor and controlling the driving portion, docking the robot cleaner into the external recharging apparatus.

17. The robot cleaner system of claim 16, wherein the recharging apparatus recognition mark is made of a retroreflective material, and the recognition mark sensor is a photo sensor capable of detecting the retroreflective material.

18. The robot cleaner system of claim 17, wherein the recognition mark sensor is formed on a front side of the robot cleaner.

19. The robot cleaner system of claim 18, wherein the recognition mark sensor is formed on both sides of the robot cleaner.

20. A robot cleaner system, comprising:

an external recharging apparatus connected to a utility power supply;

a robot cleaner comprising, a body, a driving portion for driving a plurality of wheels formed at a lower portion of the body, an upper camera mounted on an upper portion of the body to take images of a ceiling in perpendicular relation with respect to an advancing direction of the robot cleaner, and a remote controller for wirelessly controlling the robot cleaner, a recharging apparatus recognition mark formed on the external recharging apparatus; and a recognition mark sensor mounted on the body of the robot cleaner to detect the recharging apparatus recognition mark, wherein the remote controller detects the recharging apparatus recognition mark by using the recognition mark sensor, and then controls the driving portion so that the robot cleaner docks into the external recharging apparatus for charging of a rechargeable battery.

21. The robot cleaner system of claim 20, wherein the recharging apparatus recognition mark is formed on a side of a power terminal.

22. The robot cleaner system of claim 21, wherein the recharging apparatus recognition mark is made of a retroreflective material, and the recognition mark sensor is a photosensor capable of detecting the retroreflective material.

23. The robot cleaner system of claim 20, wherein the recharging apparatus recognition mark is formed on a floor in front of the external recharging apparatus.

24. The robot cleaner system of claim 23, wherein the recharging apparatus recognition mark is made of a metal tape, and the recognition mark sensor is a proximity sensor capable of detecting the metal tape.

25. A docking method of a robot cleaner for docking with an external recharging apparatus, comprising the steps of:

the robot cleaner running off from a connection with the external recharging apparatus upon reception of a work start signal, the robot cleaner, upon detecting of a first location recognition mark through an upper camera during running, storing an upper image where the first location recognition mark is first detected as an entry spot information;

the robot cleaner performing an assigned job;

upon input of a recharge command signal, the robot cleaner returning to an entry spot by using a current location information and the stored entry spot information, the current location information calculated from the upper images captured by the upper camera;

detecting the external recharging apparatus by detecting through a sensor on a robot cleaner body a recharging apparatus recognition mark;

the robot cleaner connecting to a power terminal of the external recharging apparatus by a recharging terminal thereof; and recharging a rechargeable battery with an external power through the recharging terminal.

26. The docking method of claim 25, wherein the step of detecting the external recharging apparatus comprises the steps of:

running the robot cleaner in forward direction;

determining whether there is an obstacle existing ahead using the robot cleaner;

running the robot cleaner in one direction following along the obstacle upon determining the obstacle;

determining whether a recharging apparatus recognition mark is detected during the running using the robot cleaner;

proceeding to the external recharging apparatus connecting step upon detection of the recharging apparatus recognition mark; and determining whether the running distance exceeds a predetermined reference distance, and if so, rotating the robot cleaner by 180° and running the robot cleaner to follow along the obstacle, upon no detection of the recharging apparatus recognition mark.

27. The docking method of claim 25, wherein the step of connecting the external recharging apparatus comprises the steps of:

rotating the robot cleaner so that the recharging terminal of the robot cleaner faces towards the external recharging apparatus;

running the robot cleaner and determining whether a collision signal with a bumper is received or not;

determining whether a contact signal is received or not, the contact signal indicating the recharging terminal of the robot cleaner contacts with the power terminal of the external recharging apparatus, after the collision signal of the bumper is received;

adjusting a running angle of the robot cleaner by a predetermined angle and determining whether the contact signal is received or not, upon no contact signal received after the reception of the collision signal from the bumper; and retreating the robot cleaner to the entry spot when there is no contact signal received after a predetermined number of running angle adjustments of the robot cleaner.

28. The docking method of claim 27, wherein the adjustment to the running angle of the robot cleaner is set to 15° each time.

29. The docking method of claim 28, wherein the number of adjustments to the running angle of the robot cleaner is set to 6 times.

30. The docking method of claim 25, wherein the recharge command signal is generated when there is a shortage of power in the step of performing the assigned job, or when the step of performing the assigned job is completed.

* * * * *